(12) United States Patent
Lu et al.

(10) Patent No.: US 11,089,343 B2
(45) Date of Patent: Aug. 10, 2021

(54) CAPABILITY ADVERTISEMENT, CONFIGURATION AND CONTROL FOR VIDEO CODING AND DECODING

(75) Inventors: Mei-Hsuan Lu, Bellevue, WA (US); Ming-Chieh Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1609 days.

(21) Appl. No.: 13/348,510

(22) Filed: Jan. 11, 2012

(65) Prior Publication Data

US 2013/0177071 A1  Jul. 11, 2013

(51) Int. Cl.
*H04N 21/2343* (2011.01)
*H04N 21/845* (2011.01)
(Continued)

(52) U.S. Cl.
CPC ... *H04N 21/234327* (2013.01); *H04N 19/164* (2014.11); *H04N 19/30* (2014.11);
(Continued)

(58) Field of Classification Search
CPC .. H04N 7/50; H04N 7/26244; H04N 7/26335; H04N 7/26941
See application file for complete search history.

(56) References Cited

U.S. PATENT DOCUMENTS

| 4,142,071 A | 2/1979 | Croisier et al. |
| 4,216,354 A | 8/1980 | Esteban et al. |

(Continued)

FOREIGN PATENT DOCUMENTS

| EP | 0 909 094 | 4/1999 |
| EP | 1 195 992 | 4/2002 |

(Continued)

OTHER PUBLICATIONS

Chen et al., "Bandwidth-Efficient Encoder Framework for H.264/AVC Scalable extension", 2007, IEEE, Int'l Symp. on Multimedia Workshops, pp. 401-406.*

(Continued)

*Primary Examiner* — Shawn S An
(74) *Attorney, Agent, or Firm* — Klarquist Sparkman, LLP

(57) ABSTRACT

Innovations described herein provide a framework for advertising encoder capabilities, initializing encoder configuration, and signaling run-time control messages for video coding and decoding. For example, an encoding controller receives a request for encoder capability data from a decoding host controller, determines the capability data, and sends the capability data in reply. The capability data can include data that indicate a number of bitstreams, each providing an alternative version of input video, as well as data that indicate scalable video coding capabilities. The decoding host controller creates stream configuration request data based on the encoder capability data, and sends the configuration request data to the encoding controller. During decoding, the decoding host controller can create and send a control message for run-time control of encoding, where the control message includes a stream identifier for a bitstream and layer identifiers for a given layer of the bitstream.

23 Claims, 13 Drawing Sheets

(51) Int. Cl.
*H04N 21/6379* (2011.01)
*H04N 21/462* (2011.01)
*H04N 21/24* (2011.01)
*H04N 19/164* (2014.01)
*H04N 19/30* (2014.01)

(52) U.S. Cl.
CPC ..... *H04N 21/2405* (2013.01); *H04N 21/4621* (2013.01); *H04N 21/6379* (2013.01); *H04N 21/8451* (2013.01)

(56) References Cited

U.S. PATENT DOCUMENTS

| | | | |
|---|---|---|---|
| 4,464,783 A | 8/1984 | Beraud et al. | |
| 5,243,420 A | 9/1993 | Hibi | |
| 5,381,143 A | 1/1995 | Shimoyoshi et al. | |
| 5,416,521 A | 5/1995 | Chujoh et al. | |
| 5,418,570 A | 5/1995 | Ueno et al. | |
| 5,436,665 A | 7/1995 | Ueno et al. | |
| 5,454,011 A | 9/1995 | Shimoyoshi | |
| 5,463,424 A | 10/1995 | Dressler | |
| 5,537,440 A | 7/1996 | Eyuboglu et al. | |
| 5,541,852 A | 7/1996 | Eyuboglu et al. | |
| 5,544,266 A | 8/1996 | Koppelmans et al. | |
| 5,617,142 A | 4/1997 | Hamilton | |
| 5,623,424 A | 4/1997 | Azadegan et al. | |
| 5,659,660 A | 8/1997 | Plenge et al. | |
| 5,677,735 A | 10/1997 | Ueno et al. | |
| 5,835,495 A | 11/1998 | Ferriere | |
| 5,970,173 A | 10/1999 | Lee et al. | |
| 5,986,712 A | 11/1999 | Peterson et al. | |
| 5,995,151 A | 11/1999 | Naveen et al. | |
| 6,044,089 A | 3/2000 | Ferriere | |
| 6,084,909 A | 7/2000 | Chiang et al. | |
| 6,192,075 B1 | 2/2001 | Jeng | |
| 6,192,154 B1 | 2/2001 | Rajagopalan et al. | |
| 6,249,288 B1 | 6/2001 | Campbell | |
| 6,259,741 B1 | 7/2001 | Chen et al. | |
| 6,278,691 B1 | 8/2001 | Ohyama et al. | |
| 6,278,735 B1 | 8/2001 | Mohsenian | |
| 6,285,716 B1 | 9/2001 | Knee et al. | |
| 6,370,502 B1 | 4/2002 | Wu et al. | |
| 6,393,059 B1 | 5/2002 | Sugiyama | |
| 6,404,814 B1 | 6/2002 | Apostolopoulos et al. | |
| 6,426,977 B1 | 7/2002 | Lee et al. | |
| 6,434,197 B1 | 8/2002 | Wang et al. | |
| 6,463,414 B1 | 10/2002 | Su et al. | |
| 6,466,623 B1 | 10/2002 | Youn et al. | |
| 6,496,216 B2 | 12/2002 | Feder | |
| 6,496,868 B2 | 12/2002 | Krueger et al. | |
| 6,504,494 B1 | 1/2003 | Dyas et al. | |
| 6,507,615 B1 | 1/2003 | Tsujii et al. | |
| 6,522,693 B1 | 2/2003 | Lu et al. | |
| 6,526,099 B1 | 2/2003 | Christopoulos et al. | |
| 6,529,552 B1 | 3/2003 | Tsai et al. | |
| 6,647,061 B1 | 11/2003 | Panusopone et al. | |
| 6,650,705 B1 | 11/2003 | Vetro et al. | |
| 6,678,654 B2 | 1/2004 | Zinser, Jr. et al. | |
| 6,728,317 B1 | 4/2004 | Demos | |
| 6,757,648 B2 | 6/2004 | Chen et al. | |
| 6,823,008 B2 | 11/2004 | Morel | |
| 6,925,501 B2 | 8/2005 | Wang et al. | |
| 6,931,064 B2 | 8/2005 | Mori et al. | |
| 6,934,334 B2 | 8/2005 | Yamaguchi et al. | |
| 6,937,653 B2 | 8/2005 | Song et al. | |
| 6,944,224 B2 | 9/2005 | Zhao | |
| 6,961,377 B2 | 11/2005 | Kingsley | |
| 6,963,347 B1 | 11/2005 | Selvaggi et al. | |
| 7,027,982 B2 | 4/2006 | Chen et al. | |
| 7,039,116 B1 | 5/2006 | Zhang et al. | |
| 7,058,127 B2 | 6/2006 | Lu et al. | |
| 7,068,718 B2 | 6/2006 | Kim et al. | |
| 7,085,322 B2 | 8/2006 | Ngai et al. | |
| 7,116,714 B2 | 10/2006 | Hannuksela | |
| 7,142,601 B2 | 11/2006 | Kong et al. | |
| 7,292,634 B2 | 11/2007 | Yamamoto et al. | |
| 7,295,612 B2 | 11/2007 | Haskell | |
| 7,319,720 B2 | 1/2008 | Abrams, Jr. | |
| 7,336,720 B2 | 2/2008 | Martemyanov et al. | |
| 7,343,291 B2 | 3/2008 | Thumpudi | |
| 7,346,106 B1 | 3/2008 | Jiang et al. | |
| 7,352,808 B2 | 4/2008 | Ratakonda et al. | |
| 7,643,422 B1 | 1/2010 | Covell et al. | |
| 7,694,075 B1 | 4/2010 | Feekes, Jr. | |
| 7,773,672 B2 | 8/2010 | Prieto et al. | |
| 7,840,078 B2 | 11/2010 | Segall | |
| 7,844,992 B2 * | 11/2010 | Boyce ............. H04N 21/23439 725/91 | |
| 7,885,341 B2 | 2/2011 | Chen et al. | |
| 7,936,820 B2 | 5/2011 | Watanabe et al. | |
| 8,130,828 B2 | 3/2012 | Hsu et al. | |
| 8,553,769 B2 * | 10/2013 | He ........................ H04N 19/33 375/240.12 | |
| 9,191,671 B2 | 11/2015 | Vanam et al. | |
| 2002/0036707 A1 | 3/2002 | Gu | |
| 2002/0080877 A1 | 6/2002 | Lu et al. | |
| 2002/0090027 A1 | 7/2002 | Karczewicz et al. | |
| 2002/0131492 A1 | 9/2002 | Yokoyama | |
| 2002/0136298 A1 | 9/2002 | Anantharamu | |
| 2002/0172154 A1 | 11/2002 | Uchida et al. | |
| 2002/0181584 A1 | 12/2002 | Alexandre et al. | |
| 2003/0035480 A1* | 2/2003 | Schaar et al. ............ 375/240.14 | |
| 2003/0058931 A1* | 3/2003 | Zhang ............ H04N 21/234327 375/240.01 | |
| 2003/0185298 A1 | 10/2003 | Alvarez et al. | |
| 2003/0206597 A1 | 11/2003 | Kolarov et al. | |
| 2003/0227974 A1 | 12/2003 | Nakamura et al. | |
| 2004/0117427 A1 | 6/2004 | Allen et al. | |
| 2004/0125877 A1 | 7/2004 | Chang | |
| 2004/0136457 A1 | 7/2004 | Funnell et al. | |
| 2004/0165667 A1 | 8/2004 | Lennon et al. | |
| 2004/0234142 A1 | 11/2004 | Chang et al. | |
| 2004/0264489 A1 | 12/2004 | Klemets et al. | |
| 2005/0025234 A1* | 2/2005 | Kato ................. H04N 21/41407 375/240.01 | |
| 2005/0041740 A1 | 2/2005 | Sekiguchi | |
| 2005/0053157 A1 | 3/2005 | Lillevold | |
| 2005/0075869 A1 | 4/2005 | Gersho et al. | |
| 2005/0084007 A1 | 4/2005 | Lightstone et al. | |
| 2005/0123058 A1 | 6/2005 | Greenbaum et al. | |
| 2005/0165611 A1 | 7/2005 | Mehrotra et al. | |
| 2005/0169545 A1 | 8/2005 | Ratakonda et al. | |
| 2005/0175091 A1 | 8/2005 | Puri et al. | |
| 2005/0180511 A1 | 8/2005 | Arafune et al. | |
| 2005/0195899 A1 | 9/2005 | Han | |
| 2005/0201469 A1* | 9/2005 | Sievers .......... H04N 21/234363 375/240.24 | |
| 2005/0207497 A1 | 9/2005 | Rovati et al. | |
| 2005/0228854 A1 | 10/2005 | Steinheider et al. | |
| 2005/0232497 A1 | 10/2005 | Yogeshwar et al. | |
| 2006/0002479 A1 | 1/2006 | Fernandes | |
| 2006/0114995 A1 | 6/2006 | Robey et al. | |
| 2006/0120610 A1 | 6/2006 | Kong et al. | |
| 2006/0126726 A1 | 6/2006 | Lin et al. | |
| 2006/0126744 A1 | 6/2006 | Peng et al. | |
| 2006/0159169 A1 | 7/2006 | Hui et al. | |
| 2006/0215754 A1 | 9/2006 | Buxton et al. | |
| 2006/0222078 A1 | 10/2006 | Raveendran | |
| 2006/0239343 A1 | 10/2006 | Mohsenian | |
| 2006/0245491 A1 | 11/2006 | Jam et al. | |
| 2006/0248516 A1 | 11/2006 | Gordon | |
| 2006/0248563 A1 | 11/2006 | Lee et al. | |
| 2006/0262844 A1 | 11/2006 | Chin | |
| 2006/0262846 A1* | 11/2006 | Burazerovic ........ H04N 19/176 375/240.2 | |
| 2007/0039028 A1 | 2/2007 | Bar | |
| 2007/0053444 A1 | 3/2007 | Shibata et al. | |
| 2007/0058718 A1 | 3/2007 | Shen et al. | |
| 2007/0058729 A1 | 3/2007 | Yoshinari | |
| 2007/0071105 A1 | 3/2007 | Tian et al. | |
| 2007/0140352 A1 | 6/2007 | Bhaskaran et al. | |
| 2007/0153906 A1 | 7/2007 | Petrescu et al. | |
| 2007/0160128 A1 | 7/2007 | Tian et al. | |
| 2007/0223564 A1 | 9/2007 | Bruls et al. | |

(56) References Cited

U.S. PATENT DOCUMENTS

| | | |
|---|---|---|
| 2007/0230564 A1 | 10/2007 | Chen et al. |
| 2007/0280349 A1 | 12/2007 | Prieto et al. |
| 2008/0007438 A1 | 1/2008 | Segall et al. |
| 2008/0046939 A1 | 2/2008 | Lu et al. |
| 2008/0137736 A1 | 6/2008 | Richardson et al. |
| 2008/0144723 A1 | 6/2008 | Peisong et al. |
| 2008/0151101 A1 | 6/2008 | Tian et al. |
| 2008/0165844 A1 | 7/2008 | Karczewicz |
| 2008/0165864 A1 | 7/2008 | Eleftheriadis et al. |
| 2008/0187046 A1 | 8/2008 | Joch |
| 2008/0247460 A1* | 10/2008 | Kang ............... H04N 19/61 375/240.02 |
| 2008/0259921 A1 | 10/2008 | Dinesh |
| 2009/0003452 A1 | 1/2009 | Au et al. |
| 2009/0012982 A1 | 1/2009 | Merchia et al. |
| 2009/0028247 A1 | 1/2009 | Suh et al. |
| 2009/0033739 A1 | 2/2009 | Sarkar et al. |
| 2009/0034629 A1 | 2/2009 | Suh et al. |
| 2009/0037959 A1 | 2/2009 | Suh et al. |
| 2009/0074074 A1 | 3/2009 | Au et al. |
| 2009/0110060 A1 | 4/2009 | Cortes et al. |
| 2009/0147859 A1 | 6/2009 | McGowan et al. |
| 2009/0176454 A1 | 7/2009 | Chen et al. |
| 2009/0201990 A1 | 8/2009 | Leprovost et al. |
| 2009/0219993 A1 | 9/2009 | Bronstein et al. |
| 2009/0225870 A1 | 9/2009 | Narasimhan |
| 2009/0244633 A1 | 10/2009 | Johnston |
| 2009/0268805 A1* | 10/2009 | Shanableh ........... H04N 19/172 375/240.01 |
| 2009/0279605 A1 | 11/2009 | Holcomb et al. |
| 2009/0282162 A1 | 11/2009 | Mehrotra et al. |
| 2010/0086048 A1 | 4/2010 | Ishtiaq et al. |
| 2010/0091837 A1 | 4/2010 | Zhu et al. |
| 2010/0091888 A1 | 4/2010 | Nemiroff |
| 2010/0142622 A1 | 6/2010 | Le Leannec et al. |
| 2010/0189179 A1 | 7/2010 | Gu et al. |
| 2010/0189183 A1 | 7/2010 | Gu et al. |
| 2010/0208795 A1 | 8/2010 | Hsiang |
| 2010/0272171 A1 | 10/2010 | Xu |
| 2010/0316126 A1 | 12/2010 | Chen et al. |
| 2010/0316134 A1 | 12/2010 | Chen et al. |
| 2011/0001642 A1* | 1/2011 | Yu ................... H04N 19/70 341/65 |
| 2011/0188577 A1 | 8/2011 | Kishore et al. |
| 2011/0305273 A1 | 12/2011 | He et al. |
| 2012/0044999 A1 | 2/2012 | Kim et al. |
| 2012/0051432 A1 | 3/2012 | Fernandes et al. |
| 2012/0056981 A1 | 3/2012 | Tian et al. |
| 2012/0219069 A1 | 8/2012 | Lim et al. |
| 2012/0320993 A1* | 12/2012 | Gannholm ............ H04N 19/15 375/240.27 |
| 2013/0003833 A1* | 1/2013 | Jang ................... H04N 19/105 375/240.12 |
| 2013/0034170 A1* | 2/2013 | Chen .................. H04N 13/00 375/240.25 |
| 2013/0044811 A1 | 2/2013 | Kim |
| 2013/0070859 A1* | 3/2013 | Lu .................... H04N 19/30 375/240.25 |
| 2014/0133547 A1 | 5/2014 | Tanaka |

FOREIGN PATENT DOCUMENTS

| | | |
|---|---|---|
| JP | 3032088 | 4/2000 |
| JP | 2002-152752 | 5/2002 |
| JP | 3317327 | 8/2002 |
| JP | 2003-259307 | 9/2003 |
| JP | 2005-252555 | 9/2005 |
| JP | 2007-036666 | 2/2007 |
| JP | 2007-295423 | 11/2007 |
| KR | 10-2005-0089720 | 9/2005 |
| KR | 10-2006-0132890 | 12/2006 |
| KR | 10-2008-0102141 | 11/2008 |
| WO | WO 01/95633 | 12/2001 |
| WO | WO 02/054774 A2 | 7/2002 |
| WO | WO 2004/004359 | 1/2004 |
| WO | WO 2004/025405 | 3/2004 |
| WO | WO 2004025405 A2 * | 3/2004 ......... H04N 7/17318 |
| WO | WO 2006/096612 | 9/2006 |
| WO | WO 2006/134110 | 12/2006 |
| WO | WO 2010/088030 | 8/2010 |

OTHER PUBLICATIONS

Chen et al., "Bandwidth-Efficient Encoder Framework for H.264/AVC Scalable Extension," *IEEE Int'l Symp. on Multimedia Workshops*, pp. 401-406 (2007).

Detti et al., "SVEF: an Open-Source Experimental Evaluation Framework for H.264 Scalable Video Streaming," *IEEE Symp. on Computers and Communications*, pp. 36-41 (2009).

Kofler et al., "Improving IPTV Services by H.264/SVC Adaptation and Traffic Control, " *IEEE Int'l Symp. on Broadband Multimedia Systems and Broadcasting*, 6 pp. (2009).

Ortiz Murillo et al., "Towards User-driven Adaptation of H.264/SVC Streams," *European Conf. on Interactive TV and Video*, 4 pp. (2010).

Zhu et al., "Rate Control Scheme for Temporal Scalability of H.264/SVC Based on New Rate Distortion Model," *Journal of Convergence Information Technology*, vol. 6, No. 1, pp. 24-33 (Jan. 2011).

Huang et al., "Optimal Coding Rate Control of Scalable and Multi Bit Rate Streaming Media," Microsoft Research Technical Report MSR-TR-2005-47, Apr. 2005 (also appeared in Proc. International Packet Video Workshop (PV 2004), Irvine, CA, Dec. 2004 and in Proc. Picture Coding Symposium (PCS 2004), San Francisco, CA, Dec. 2004, 26 pages.

U.S. Appl. No. 60/341,674, filed Dec. 17, 2001, Lee et al.

U.S. Appl. No. 60/488,710, filed Jul. 18, 2003, Srinivasan et al.

U.S. Appl. No. 60/501,081, filed Sep. 7, 2003, Srinivasan et al.

U.S. Appl. No. 60/501,133, filed Sep. 7, 2003, Holcomb et al.

Akramullah et al., "Parallelization of MPEG-2 Video Encoder for Parallel and Distributed Computing Systems," *IEEE*, pp. 834-837 (Aug. 1995).

Asbun et al., "Very Low Bit Rate Wavelet-Based Scalable Video Compression," *Proc. Int'l Conf. on Image Processing*, vol. 3, pp. 948-952 (Oct. 1998).

Assuncao et al., "A Frequency-Domain Video Transcoder for Dynamic Bit-Rate Reduction of MPEG-2 Bit Streams," IEEE Transactions on Circuits and Systems for Video Technology, vol. 8, No. 8, pp. 953-967 (Dec. 1998).

Assuncao et al., "Buffer Analysis and Control in CBR Video Transcoding," *IEEE Transactions on Circuits and Systems for Video Technology*, vol. 10, No. 1, pp. 83-92 (Feb. 2000).

Assuncao et al., "Transcoding of Single-Layer MPEG Video Into Lower Rates," *IEE Proc.-Vis. Image Signal Process.*, vol. 144, No. 6, pp. 377-383 (Dec. 1997).

ATI Technologies, Inc., "Introduction to H.264," 6 pp. (month unknown, 2005).

Braun et al., "Motion-Compensating Real-Time Format Converter for Video on Multimedia Displays," *Proceedings IEEE 4th International Conference on Image Processing (ICIP-97)*, vol. I, pp. 125-128 (Oct. 1997).

Brightwell et al., "Flexible Switching and Editing of MPEG-2 Video Bitstreams," *IBC-97*, 11 pp. (Sep. 1997).

Chang et al., "Real-Time Content-Based Adaptive Streaming of Sports Videos," *IEEE*, pp. 139-146 (Jul. 2001).

Chen et al., "Implementation of H.264 Encoder and Decoder on Personal Computers," *Journal of Visual Comm. and Image Representation*, 19 pp. (Apr. 2006).

Chen, "Synchronization and Control of Multi-threads for MPEG-4 Video Decoder," *IEEE 1999 Int'l Conf. on Consumer Electronics*, pp. 298-299 (Jun. 1999).

Crooks, "Analysis of MPEG Encoding Techniques on Picture Quality," *Tektronix Application Note*, 11 pp. (Jun. 1998).

Dawson, "Coding for Multiple Cores on Xbox 360 and Microsoft Windows," 8 pp. (Aug. 2006) [Downloaded from the Internet on Jan. 22, 2007].

(56) References Cited

OTHER PUBLICATIONS

Dipert, "Image Compression Article Addendum," *EDN Magazine*, 8 pp. (Jun. 18, 1998).
Duffy, "CLR Inside Out: Using Concurrency for Scalability," MSDN Magazine, 11 pp. (Sep. 2006) [Downloaded from the Internet on Jan. 22, 2007].
Flordal et al., "Accelerating CABAC Encoding for Multi-standard Media with Configurability," IEEE Xplore, 8 pp. (Apr. 2006).
Fogg, "Question That Should Be Frequently Asked About MPEG," Version 3.8, 46 pp. (Apr. 1996).
foldoc.org, "priority scheduling," 1 p. (No date) [Downloaded from the Internet on Jan. 26, 2007].
foldoc.org, "multitasking," 1 p. (Document dated Apr. 24, 1998) [Downloaded from the Internet on Jan. 26, 2007].
Gerber et al., "Optimizing Video Encoding using Threads and Parallelism: Part 1—Threading a video codec," 3 pp., downloaded from Embedded.com, (Dec. 2009).
Gibson et al., *Digital Compression for Multimedia*, "Chapter 4: Quantization," Morgan Kaufman Publishers, Inc., pp. 113-138 (Jan. 1998).
Gibson et al., *Digital Compression for Multimedia*, "Chapter 7: Frequency Domain Coding," Morgan Kaufman Publishers, Inc., pp. 227-262 (Jan. 1998).
Gill, "Tips and Tricks for Encoding Long Format Content with Windows Media Encoder," downloaded from World Wide Web, 12 pp. (document marked Aug. 2003).
Hamming, *Digital Filters*, Second Edition, "Chapter 2: The Frequency Approach," Prentice-Hall, Inc., pp. 19-31 (Jan. 1983).
Haskell et al., *Digital Video: An Introduction to MPEG-2*, Table of Contents, International Thomson Publishing, 6 pp. (1997).
Huang et al., "Optimal Control of Multiple Bit Rates for Streaming Media," *Proc. Picture Coding Symposium*, 4 pp. (Dec. 2004).
Intel Corp., "Intel's Next Generation Integrated Graphics Architecture—Intel® Graphics Media Accelerator X3000 and 3000," 14 pp. (Jul. 2006).
ISO/IEC, "ISO/IEC 11172-2, Information Technology—Coding of Moving Pictures and Associated Audio for Digital Storage Media at up to about 1.5 Mbit/s—Part 2: Video," 112 pp. (Aug. 1993).
ISO/IEC, "JTC1/SC29/WG11 N2202, Information Technology—Coding of Audio-Visual Objects: Visual, ISO/IEC 14496-2," 329 pp. (Mar. 1998).
ISO/IEC MPEG-2 Test Model 5, "TM5 Overview," 10 pp. (Mar. 1993).
Ito et al., "Rate control for video coding using exchange of quantization noise and signal resolution," *Electronics & Communications in Japan*, Part II, Hoboken, New Jersey, vol. 83, No. 1, Jan. 1, 2000, pp. 33-43.
ITU-T, "ITU-T Recommendation H.261, Video Codec for Audio-visual Services at p × 64 kbits," 25 pp. (Mar. 1993).
ITU-T, "ITU-T Recommendation H.262, Information Technology—Generic Coding of Moving Pictures and Associated Audio Information: Video," 205 pp. (Jul. 1995).
ITU-T, "ITU-T Recommendation H.263, Video Coding for Low Bit Rate Communication," 162 pp. (Feb. 1998).
ITU-T, "ITU-T Recommendation H.264, Advanced video coding for generic audiovisual services," 676 pp. (Mar. 2010).
Jacobs et al., "Thread-Parallel MPEG-2, MPEG-4 and H.264 Video Encoders for SoC Multi-Processor Architectures," *IEEE Trans. On Consumer Electronics*, vol. 52, No. 1, pp. 269-275 (Feb. 2006).
Joint Video Team (JVT) of ISO/IEC MPEG & ITU-T VCEG, "Joint Final Committee Draft (JFCD) of Joint Video Specification," JVT-D157, 207 pp. (Aug. 2002).
Kamikura et al., "Global brightness-variation compensation for video coding" *IEEE Trans. on Circuits and Systems for Video Technology*, vol. 8, No. 8, pp. 988-1000 (Dec. 1998).
Kari et al., "Intensity controlled motion compensation," *Data Compression Conference Proc.*, pp. 249-258, (Mar. 30-Apr. 1, 1998).
Keesman et al., "Transcoding of MPEG Bitstreams," *Signal Processing: Image Communication* 8, pp. 481-500 (Sep. 1996).

Khan et al., "Architecture Overview of Motion Vector Reuse Mechanism in MPEG-2 Transcoding," Technical Report TR2001-01-01, 7 pp. (Jan. 2001).
Kim et al., "Multi-thread VLIW processor architecture for HDTV decoding," *IEEE 2000 Custom Integrated Circuits Conf.*, pp. 559-562 (May 2000).
Knee et al., "Seamless Concatenation—A 21st Century Dream," 13 pp. (Jun. 1997).
Lei et al., "Rate Adaptation Transcoding for Precoded Video Streams," 13 pp. (month unknown, 2000).
Leventer et al., "Towards Optimal Bit-Rate Control in Video Transcoding," *ICIP*, pp. 265-268 (Sep. 2003).
Loomis et al., "VC-1 Technical Overview," 7 pp. (Apr. 2006) [Downloaded from the Internet on Jan. 24, 2007].
Microsoft Corporation, "Microsoft Debuts New Windows Media Player 9 Series, Redefining Digital Media on the PC," 4 pp. (Sep. 4, 2002) [Downloaded from the World Wide Web on May 14, 2004].
Microsoft Corporation, "Windows Media and Web Distribution for Broadcasters," downloaded from the World Wide Web, 4 pp. (document marked Sep. 2007).
Microsoft Corporation, "Microsoft Lync—Unified Communication Specification for H.264 AVC and SVC UCConfig Modes V 1.1," 37 pp. (Jun. 2011).
Microsoft Corporation, "Microsoft Lync—Unified Communication Specification for H.264 AVC and SVC Encoder Implementation V 1.01," 32 pp. (Jan. 2011).
Miyata et al., "A novel MPEG-4 rate control method with spatial resolution conversion for low bit-rate coding," *Conference Proceedings / IEEE International Symposium on Circuits and Systems (ISCAS)*, Kobe, Japan, May 23-26, 2005, pp. 4538-4541.
Mook, "Next-Gen Windows Media Player Leaks to the Web," *BetaNews*, 17 pp. (Jul. 2002) [Downloaded from the World Wide Web on Aug. 8, 2003].
Moshnyaga, "An Implementation of Data Reusable MPEG Video Coding Scheme," *Proceedings of World Academy of Science, Engineering and Technology*, vol. 2, pp. 193-196 (Jan. 2005).
Moshnyaga, "Reduction of Memory Accesses in Motion Estimation by Block-Data Reuse," *ICASSP '02 Proceedings, IEEE International Conference on Acoustics, Speech, and Signal Processing*, vol. 3, pp. III-3128-III-3131 (May 2002).
Nasim et al., "Architectural Optimizations for Software-Bassed MPEG4 Video Encoder," *13th European Signal Processing Conference: EUSIPCO '2005*, 4 pp. (Sep. 2005).
Nuntius Systems, Inc., "H.264—a New Technology for Video Compression", downloaded from the World Wide Web, 4 pp. (document marked Mar. 2004).
Oehring et al., "MPEG-2 Video Decompression on Simultaneous Multithreaded Multimedia," *Int. Conf. on Parallel Architectures and Compilation Techniques (PACT '99)*, Newport Beach, CA (Oct. 1999).
Ostermann et al., "Video Coding with H.264/AVC: Tools, Performance, and Complexity," *IEEE Circuits and Systems Magazine*, pp. 7-28 (Aug. 2004).
Ozcelebi et al., "Optimal rate and input format control for content and context adaptive video streaming," *2004 International Conference on Image Processing (ICIP)*, Singapore, Oct. 24-27, 2004, pp. 2043-2046.
Ozcelebi et al., "Optimal rate and input format control for content and context adaptive streaming of sports videos," *2004 IEEE 6th Workshop on Multimedia Signal Processing*, Siena, Italy, Sep. 29-Oct. 1, 2004, pp. 502-505.
Printouts of FTO directories from http://ftp3.itu.ch, 8 pp. [Downloaded from the World Wide Web on Sep. 20, 2005].
Reader, "History of MPEG Video Compression—Ver. 4.0," 99 pp. [Document marked Dec. 16, 2003].
RealNetworks, Inc., "Chapter 5: Producing Video," downloaded from the World Wide Web, 22 pp. (document marked 2004).
Reed et al., "Optimal multidimensional bit-rate control for video communication," *IEEE Transactions on Image Processing*, vol. 11, No. 8, pp. 873-874 (Aug. 1, 2002).

(56) References Cited

OTHER PUBLICATIONS

Roy et al., "Application Level Hand-off Support for Mobile Media Transcoding Sessions," *Proceedings of the 12th International Workshop on Network and Operating Systems Support for Digital Audio and Video*, 22 pp. (May 2002).

Sambe et al., "High-speed Distributed Video Transcoding for Multiple Rates and Formats," *IEICE Trans on Information and Systems*, vol. E88-D, Issue 8, pp. 1923-1931 (Aug. 2005).

Schwarz et al., "Overview of the Scalable Video Coding Extension of the H.264/AVC Standard," *IEEE Trans. on Circuits and Systems for Video Technology*, vol. 17, No. 9, pp. 1103-1120 (Sep. 2007).

Senda et al., "A Realtime Software MPEG Transcoder Using a Novel Motion Vector Reuse and a SIMD Optimization Techniques," *ICASSP '99 Proceedings, 1999 IEEE International Conference on Acoustics, Speech, and Signal Processing*, vol. 4, pp. 2359-2362 (Mar. 1999).

Shanableh et al., "Heterogeneous Video Transcoding to Lower Spatio-Temporal Resolutions and Different Encoding Formats," *IEEE Transactions on Multimedia*, 31 pp. (Jun. 2000).

Shanableh et al., "Transcoding of Video Into Different Encoding Formats," *ICASSP-2000 Proceedings*, vol. IV of VI, pp. 1927-1930 (Jun. 2000).

SMPTE, "Proposed SMPTE Standard for Television: VC-1 Compressed Video Bitstream Format and Decoding Process," SMPTE 421M, pp. i-xx, 5-7, 23-27 (Aug. 2005).

SMPTE, "SMPTE 327M-2000—MPEG-2 Video Recoding Data Set," 9 pp. (Jan. 2000).

Sullivan et al., "DirectX Video Acceleration (DXVA) Specification for H.264/MPEG-4 Scalable Video Coding (SVC) Off-Host VLD Mode Decoding," 24 pp. (Jun. 2012).

Sullivan, "DirectX Video Acceleration Specification for H.264/AVC Decoding," 66 pp. (Dec. 2007, updated Dec. 2010).

Sullivan et al., "DirectX Video Acceleration Specification for H.264/MPEG-4 AVC Multiview Video Coding (MVC), Including the Stereo High Profile," 17 pp. (Mar. 2011).

Sun et al., "Architectures for MPEG Compressed Bitstream Scaling," *IEEE Transactions on Circuits and Systems for Video Technology*, vol. 6, No. 2, pp. 191-199 (Apr. 1996).

Sun et al., "Lossless Coders," *Digital Signal Processing for Multimedia Systems*, Chapter 15, pp. 385-416 (Mar. 1999).

Swann et al., "Transcoding of MPEG-II for Enhanced Resilience to Transmission Errors," *Cambridge University Engineering Department*, Cambridge, UK, pp. 1-4 (Sep. 1996).

Takahashi et al., "Motion Vector Synthesis Algorithm for MPEG2-to-MPEG4 Transcoder," *Proc. of SPIE*, vol. 4310, pp. 872-882 (Jan. 2001).

Tan et al., "On the Methods and Performances of Rational Downsizing Video Transcoding," *Signal Processing: Image Communication* 19, pp. 47-65 (Jan. 2004).

Tektronix Application Note, "Measuring and Interpreting Picture Quality in MPEG Compressed Video Content," 8 pp. (2001).

Tsai et al., "Rate-Distortion Model for Motion Prediction Efficiency in Scalable Wavelet Video Coding," *17th International Packet Video Workshop*, 9 pp. (May 2009).

Tudor et al., "Real-Time Transcoding of MPEG-2 Video Bit Streams," *BBC R&D*, U.K., 6 pp. (Sep. 1997).

Van Der Tol et al., "Mapping of MPEG-4 decoding on a flexible architecture platform," *Proceedings of the SPIE, Media Processors*, vol. 4674, 13 pp. (Jan. 2002).

Van Der Tol et al., "Mapping of H.264 decoding on a multiprocessor architecture," *Proceedings of the SPIE*, vol. 5022, pp. 707-718 (May 2003).

Vetro et al., "Complexity-Quality Analysis of Transcoding Architectures for Reduced Spatial Resolution," *IEEE Transactions on Consumer Electronics*, 9 pp. (Aug. 2002).

Vishwanath et al., "A VLSI Architecture for Real-Time Hierarchical Encoding/Decoding of Video Using the Wavelet Transform," *Proc. ICASSP*, 5 pp. (Apr. 1994).

Waggoner, "In Depth Microsoft Silverlight," downloaded from the World Wide Web, 94 pp. (document marked 2007).

Watkinson, *The MPEG Handbook*, pp. 275-281 (Nov. 2004).

Werner, "Generic Quantiser for Transcoding of Hybrid Video," *Proc. 1997 Picture Coding Symposium*, Berlin, Germany, 6 pp. (Sep. 1997).

Werner, "Requantization for Transcoding of MPEG-2 Intraframes," *IEEE Transactions on Image Processing*, vol. 8, No. 2, pp. 179-191 (Feb. 1999).

Wiegand et al., "Overview of the H.264/AVC Coding Standard," *IEEE Trans. on Circuits and Systems for Video Technology*, vol. 13, No. 7, pp. 560-576 (Jul. 2003).

Youn et al., "Video Transcoder Architectures for Bit Rate Scaling of H.263 Bit Streams," *ACM Multimedia* 1999, Orlando, Florida, pp. 243-250 (Oct. 1999).

Zhou et al., "Motion Vector Reuse Algorithm to Improve Dual-Stream Video Encoder," *ICSP 2008, 9th International Conference on Signal Processing*, pp. 1283-1286 (Oct. 2008).

\* cited by examiner software 180 implementing one or more innovations in capability advertisement, configuration and run-time control for video coding and decoding

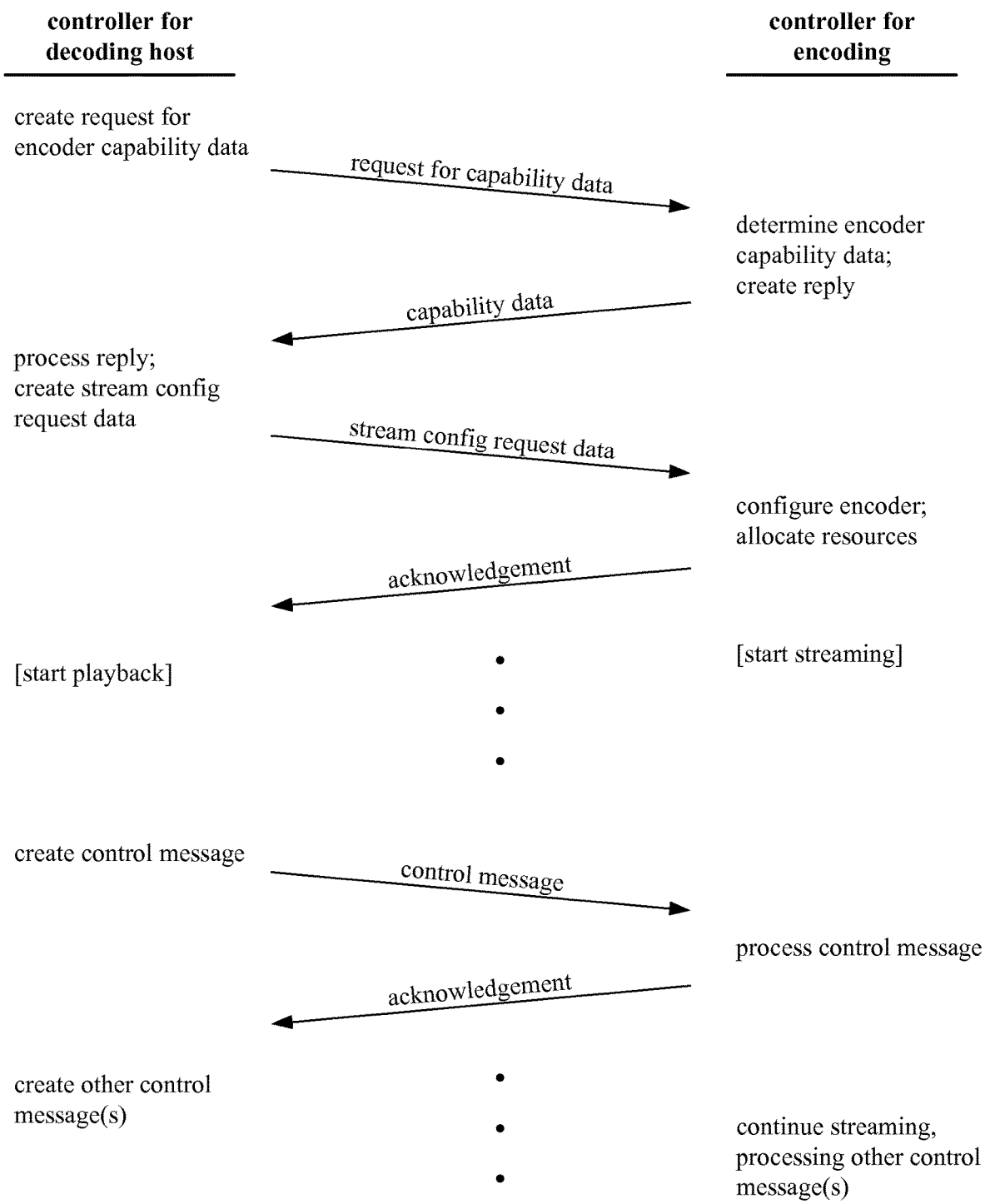

Figure 11a  1101

```
typedef union _H264SVCCapability {
    struct {
        unsigned int MaxNumOfTemporalEnhancementLayers : 3;
        unsigned int RewriteSupport : 1;
        unsigned int MaxNumOfCGSEnhancementLayers : 3;
        unsigned int MaxNumOfMGSSublayers : 3;
        unsigned int AdditionalSNRScalabilitySupport : 1;
        unsigned int MaxNumOfSpatialEnhancementLayers : 3;
        unsigned int ReservedBits : 18;
    };
    unsigned int dwBitFields;
} H264SVCCapability;
```

Figure 11b  1102

```
HRESULT QueryEncoderCapability (
    unsigned short *pwMaxNumOfSimulcastStreamsMinus1,
    H264SVCCapability *pMaxH264SVCCapability,
    unsigned short *pwMaxMacroblockProcessingRateArraySize,
    unsigned int *pdwMaxMacroblockProcessingRate,
    unsigned short *pwMaxInputWidth,
    unsigned short *pwMaxInputHeight,
    unsigned int *pdwMaxInputFrameRate,
    ...
);
```

Figure 12a 1201

```
typedef struct _H264SVCStreamLayout {
    unsigned short BaseOutputWidth;
    unsigned short BaseOutputHeight;
    union {
        struct {
            unsigned int NumberOfTemporalEnhancementLayers : 3;
            unsigned int SNRModeBase : 1;
            unsigned int SNRModeAttributeBase : 1;
            unsigned int NumberOfSNREnhancementLayersBase : 2;
            unsigned int SNRMode1st : 1;
            unsigned int SNRModeAttribute1st : 1;
            unsigned int NumberOfSNRLayers1st : 3;
            unsigned int UpscaleRatio1st : 1;
            unsigned int SNRMode2nd : 1;
            unsigned int SNRModeAttribute2nd : 1;
            unsigned int NumberOfSNRLayers2nd : 2;
            unsigned int UpscaleRatio2nd : 1;
            unsigned int SNRMode3rd : 1;
            unsigned int SNRModeAttribute3rd : 1;
            unsigned int NumberOfSNRLayers3rd : 2;
            unsigned int UpscaleRatio3rd : 1;
            unsigned int ReservedBits : 9;
        };
        unsigned int dwBitFields;
    }
} H264SVCStreamLayout;
```

Figure 12b 1202

```
HRESULT InitializeEncoder (
    unsigned short wInputWidth,
    unsigned short wInputHeight,
    unsigned short wNumOfSimulcastStreamMinus1,
    H264SVCStreamLayout *pH264SVCStreamLayout,
    ...
);
```

Figure 13a    <u>1301</u>

```c
typedef union _StreamLayerId {
    struct {
        unsigned short TemporalId : 3;
        unsigned short QualityId : 3;
        unsigned short DependencyId : 4;
        unsigned short StreamId : 4;
        unsigned short ReservedBits : 2;
    };
    unsigned short wBitFields;
} StreamLayerId;
```

Figure 13b    <u>1302</u>

```c
HRESULT InsertSyncPicture (
    unsigned short wSyncPicType,
    StreamLayerId wLayerId
);
```

Figure 13c    <u>1303</u>

```c
HRESULT SetResolution (
    unsigned short wBaseOutputWidth,
    unsigned short wBaseOutputHeight,
    StreamLayerId wLayerId
);
```

Figure 13d  1304

```
HRESULT SetPriorityId (
    unsigned short wPriorityId,
    StreamLayerID wLayerId
);
```

Figure 13e  1305

```
HRESULT SetBitrateControlInfo (
    unsigned int PeakBitrateOrIQp;
    unsigned int AverageBitrateOrPQp;
    unsigned int LeakyBucketSizeOrBQp;
    StreamLayerId wLayerId
);
```

Figure 13f  1306

```
HRESULT StartLayer (
    StreamLayerId wLayerId
);
```

Figure 13g  1307

```
HRESULT StopLayer (
    StreamLayerId wLayerId
);
```

CAPABILITY ADVERTISEMENT, CONFIGURATION AND CONTROL FOR VIDEO CODING AND DECODING

BACKGROUND

When video is streamed over the Internet and played back through a Web browser or media player, the video is delivered in digital form. Digital video is also used when video is delivered through many broadcast services, satellite services and cable television services. Real-time videoconferencing often uses digital video, and digital video is used during video capture with most smartphones, Web cameras and other video capture devices.

Digital video can consume an extremely high amount of bits. The number of bits that is used per second of represented video content is known as the bit rate. Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the H.261, H.262 (MPEG-2 or ISO/IEC 13818-2), H.263 and H.264 (MPEG-4 AVC or ISO/IEC 14496-10) standards and the MPEG-1 (ISO/IEC 11172-2), MPEG-4 Visual (ISO/IEC 14496-2) and SMPTE 421M standards. In particular, decoding according to the H.264 standard is widely used in game consoles and media players to play back encoded video. H.264 decoding is also widely used in set-top boxes, personal computers, smart phones and other mobile computing devices for playback of encoded video streamed over the Internet or other networks. A video codec standard typically defines options for the syntax of an encoded video bitstream, detailing parameters in the bitstream when particular features are used in encoding and decoding. In many cases, a video codec standard also provides details about the decoding operations a decoder should perform to achieve correct results in decoding.

Several factors affect quality of video information, including spatial resolution, frame rate and distortion. Spatial resolution generally refers to the number of samples in a video image. Images with higher spatial resolution tend to look crisper than other images and contain more discernable details. Frame rate is a common term for temporal resolution for video. Video with higher frame rate tends to mimic the smooth motion of natural objects better than other video, and can similarly be considered to contain more detail in the temporal dimension. During encoding, an encoder can selectively introduce distortion to reduce bit rate, usually by quantizing video information during encoding. If an encoder introduces little distortion, the encoder maintains quality at the cost of higher bit rate. An encoder can introduce more distortion to reduce bit rate, but quality typically suffers. For these factors, the tradeoff for high quality is the cost of storing and transmitting the information in terms of bit rate.

When encoded video is delivered over the Internet to set-top boxes, mobile computing devices or personal computers, one video source can provide encoded video to multiple receiver devices. Or, in a videoconference, one device may deliver encoded video to multiple receiver devices. Different receiver devices may have different screen sizes or computational capabilities, with some devices able to decode and play back high quality video, and other devices only able to play back lower quality video. Also, different receiver devices may use network connections having different bandwidths, with some devices able to receive higher bit rate (higher quality) encoded video, and other devices only able to receive lower bit rate (lower quality) encoded video.

In such scenarios, with simulcast encoding and delivery, video is encoded in multiple different ways to provide versions of the video at different levels of distortion, temporal quality and/or spatial resolution quality. Each version of video is represented in a bitstream that can be decoded to reconstruct that version of the video, independent of decoding other versions of the video. A video source (or given receiver device) can select an appropriate version of video for delivery to the receiver device, considering available network bandwidth, screen size, computational capabilities, or another characteristic of the receiver device.

Scalable video coding and decoding are another way to provide different versions of video at different levels of distortion, temporal quality and/or spatial resolution quality. With scalable video coding, an encoder splits video into a base layer and one or more enhancement layers. The base layer alone provides a reconstruction of the video at a lower quality level (e.g., lower frame rate, lower spatial resolution and/or higher distortion). One or more enhancement layers can be decoded along with the base layer video data to provide a reconstruction with increased video quality in terms of higher frame rate, higher spatial resolution and/or lower distortion. Scalability in terms of distortion is sometimes called signal-to-noise ratio (SNR) scalability. A receiver device can receive a scalable video bitstream and decode those parts of it appropriate for the receiver device, which may be the base layer video only, the base layer video plus some of the enhancement layer video, or the base layer video plus all enhancement layer video. Or, a video source, media server or given receiver device can select an appropriate version of video for delivery to the receiver device, considering available network bandwidth, screen size, computational capabilities, or another characteristic of the receiver device, and deliver only layers for that version of the video to the receiver device.

Scalable video coding enables a rich set of configuration options, but this flexibility poses challenges for an encoder to advertise its encoding capabilities. It also poses challenges in terms of configuring which scalable video coding options are used for a given bitstream and signaling of run-time controls during encoding.

SUMMARY

In summary, innovations described herein provide a framework for advertising encoder capabilities, initializing encoder configuration, and signaling run-time control messages for video coding and decoding. In various scenarios, the framework facilitates scalable video coding/decoding, simulcast video coding/decoding, or video coding/decoding that combines features of scalable and simulcast video coding/decoding.

According to a first set of innovations described herein, encoder capabilities are advertised. A controller for encoding receives a request for encoder capability data. For example, the encoding controller receives the request as part of a function call from a controller for a decoding host. For a given session, the encoding can include scalable video coding and/or simulcast video coding.

The encoding controller determines the encoder capability data, which can include various types of data. It can include data that indicate a number of bitstreams, each bitstream providing an alternative version of input video. For example, the number of bitstreams is a maximum number of simulcast bitstreams supported by an encoder, where each bitstream can be encoded as a scalable bitstream or non-scalable bitstream. The capability data can also include data that indicate scalable video coding capabilities for encoding of the bitstreams. The encoder capability data can further include data that indicate computational limits for the encoding of the bitstreams, which can, for example, be parameterized in terms of macroblocks per second. The encoder capability data can also include data that indicate spatial resolution and/or frame rate of the input video. The encoding controller sends the encoder capability data, for example, as part of a reply, to a decoding host controller.

From the perspective of a decoding host controller, the decoding host controller creates a request for encoder capability data and sends the request, for example, as part of a function call to an encoding controller as described above. For a given session, the encoded video data can include data encoded using scalable video coding and/or simulcast video coding. The decoding host controller receives encoder capability data in reply and processes the encoder capability data.

According to a second set of innovations described herein, an encoder is initially configured. A controller for a decoding host determines encoder capability data for an encoder. For example, the decoding host controller determines the encoder capability data by requesting it and receiving it from an encoding controller. The decoding host controller then creates stream configuration request data based at least in part on the encoder capability data. The stream configuration request data can include various types of data. It can include data that indicate a number of bitstreams, each bitstream providing an alternative version of input video. For example, the number of bitstreams is a target number of simulcast bitstreams, where each bitstream can be encoded as a scalable bitstream or non-scalable bitstream. The configuration request data can also include data that indicate scalable video coding options for the bitstreams. The decoding host controller sends the stream configuration request data, for example, as part of a function call to the encoding controller. Eventually, the decoding host controller receives and processes a reply.

From the perspective of an encoding controller, the encoding controller receives stream configuration request data. The encoding controller processes the stream configuration request data, for example, configuring an encoder and allocating encoder resources if the stream configuration request is permissible. The encoding controller then sends a reply, e.g., indicating successful configuration according to the request, or indicating failure.

According to a third set of innovations described herein, run-time control messages are signaled. During decoding of encoded video data for a bitstream, a decoding host controller creates a control message for run-time control of encoding for the bitstream. The control message includes layer identifier data. For example, the layer identifier data can include at least a stream identifier for the bitstream and a layer identifier for a given layer of the bitstream. The layer identifier data can include different types of layer identifiers. The stream identifier and/or a layer identifier can use a wild card symbol to identify multiple different streams and/or multiple different layers. The decoding host controller then sends the control message, e.g., as part of a function call to an encoding controller. The control message can be, for example, a request to insert a synchronization picture for the given layer, a request to change spatial resolution for the given layer, a request to start streaming of a subset of the bitstream, a request to stop streaming of a subset of the bitstream, or another request.

From the perspective of a controller for encoding, the encoding controller receives and processes the control message. For example, the encoding controller receives a control message as described above from a decoding host controller. The way the control message is processed depends on the type of control message. The encoding controller then sends a reply, e.g., indicating successful processing of the control message as expected, or indicating failure.

The foregoing and other objects, features, and advantages of the invention will become more apparent from the following detailed description, which proceeds with reference to the accompanying figures.

BRIEF DESCRIPTION OF THE DRAWINGS

FIG. 3 is a protocol diagram illustrating a generalized approach to capability advertisement, configuration and run-time control for video coding and decoding.

FIGS. 11a, 11b, 12a, 12b and 13a-13g are pseudocode listings that show data structures and interface signatures for the example approach.

DETAILED DESCRIPTION

Innovations for encoder capability advertisement, encoder configuration and run-time control for video coding and decoding are described herein. An encoding controller advertises encoding capabilities to a decoding host controller, which specifies an initial configuration for encoding subject to the advertised encoder capabilities. The decoding host controller and encoding controller can then exchange run-time control messages during streaming. Example data structures, signatures for functions calls, and call flows for communication between a decoding host controller and encoding controller are presented.

In some examples described herein, encoder capability advertisement, encoder configuration and run-time control messages are described for encoders that perform scalable video coding (SVC) compliant with the H.264 standard to produce H.264/SVC bitstreams. Innovations described herein can also be implemented for encoder capability advertisement, encoder configuration and run-time control messages for video coding and decoding according to other standards or formats. For example, innovations described herein can be used for encoder capability advertisement, encoder configuration and run-time control messages for VP6, VP8, SMPTE 421M or another format, including formats under development such as H.265 or HEVC.

More generally, various alternatives to the examples described herein are possible. Certain techniques described with reference to flowchart diagrams can be altered by changing the ordering of stages shown in the flowcharts, by splitting, repeating or omitting certain stages, etc. The various aspects of encoder capability advertisement, encoder configuration and run-time control messages can be used in combination or separately. Different embodiments use one or more of the described innovations. Some of the techniques and tools described herein address one or more of the problems noted in the background. Typically, a given technique/tool does not solve all such problems.

I. Example Computing Systems

Figure 1:
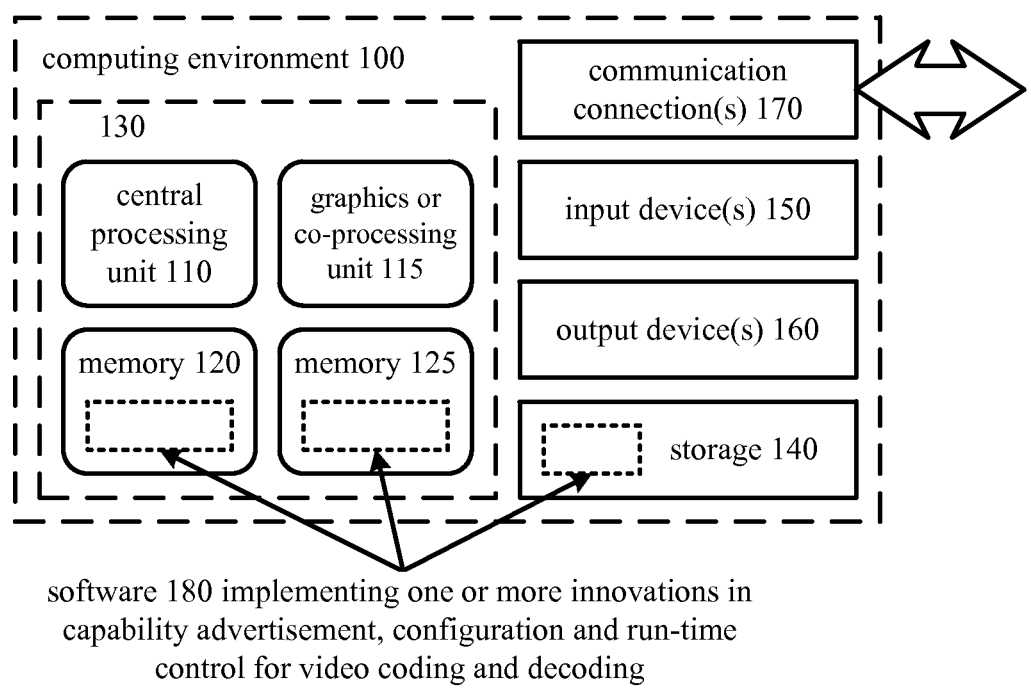
FIG. 1 is a diagram of an example computing system in which some described embodiments can be implemented.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). In FIG. 1, this most basic configuration (130) is included within a dashed line. The processing units (110, 115) execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for encoder capability advertisement, encoder configuration and run-time control for video coding and decoding, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information in a non-transitory way and which can be accessed within the computing system (100). The storage (140) stores instructions for the software (180) implementing one or more innovations for encoder capability advertisement, encoder configuration and run-time control for video coding and decoding.

The input device(s) (150) may be a touch input device such as a keyboard, mouse, pen, or trackball, a voice input device, a scanning device, or another device that provides input to the computing system (100). For video encoding, the input device(s) (150) may be a camera, video card, TV tuner card, or similar device that accepts video input in analog or digital form, or a CD-ROM or CD-RW that reads video samples into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Frameworks for Capability Advertisement, Configuration and Control

Figure 2A:
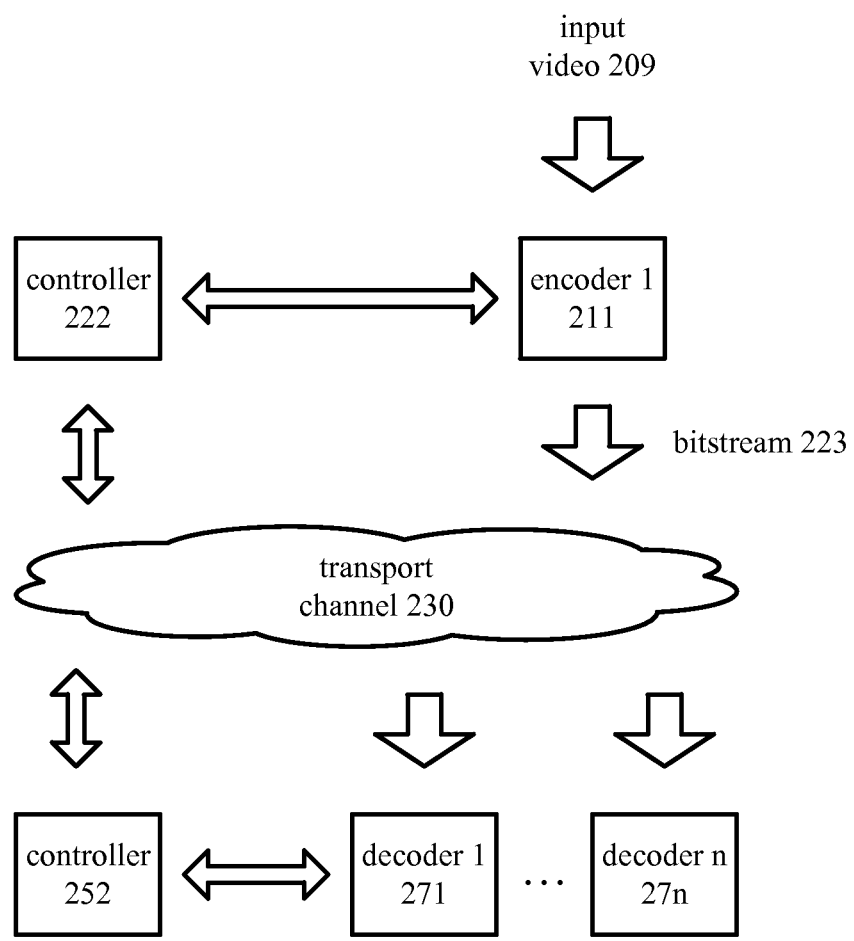
FIGS. 2a, 2b and 2c are diagrams of frameworks for encoding and decoding in conjunction with which some described embodiments can be implemented.
Figure 2B:
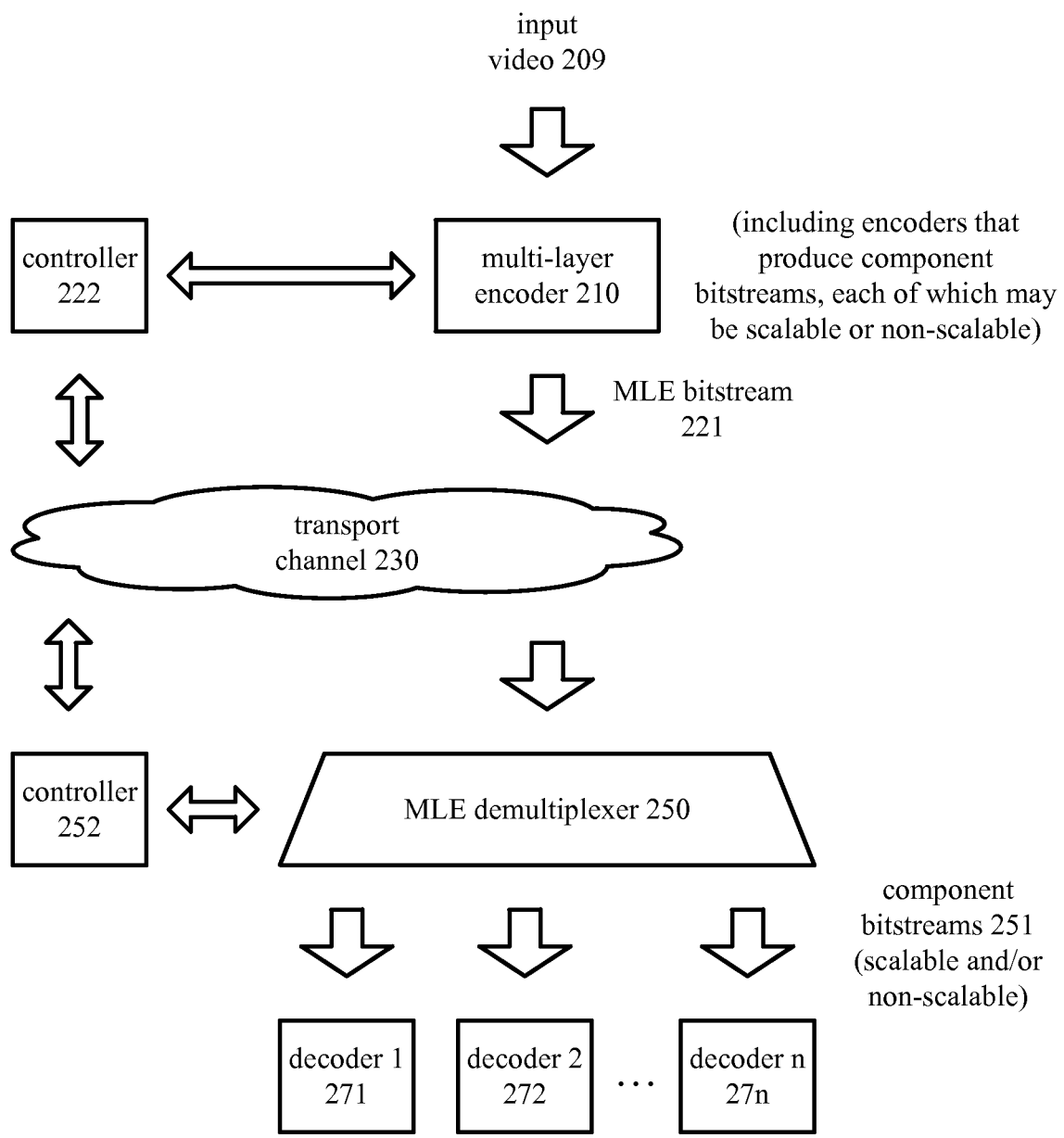
Figure 2C:
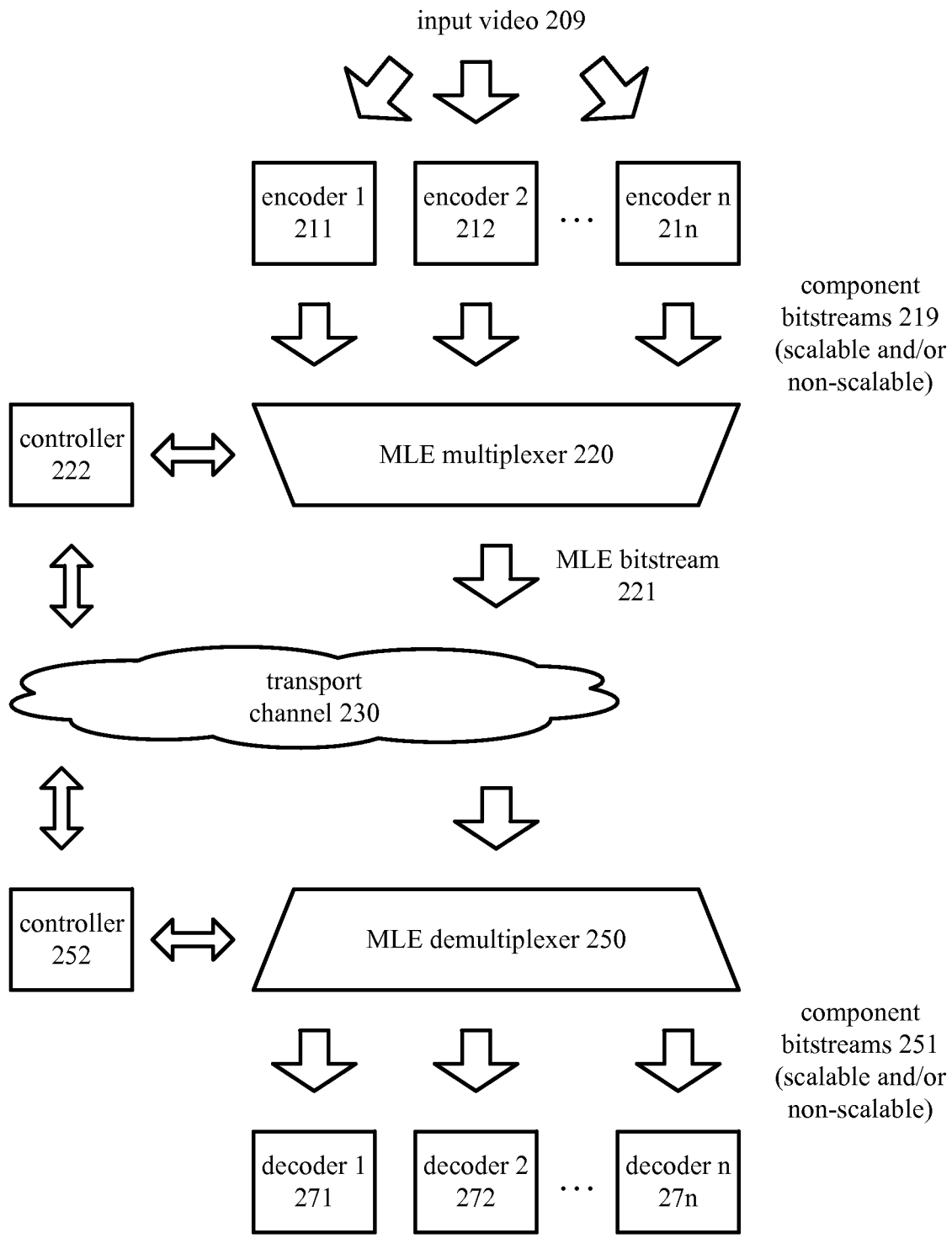

FIGS. 2a, 2b and 2c show frameworks (201, 202, 203) that include video encoders and video decoders as well as controllers for a decoding host and encoding. In general, a decoding host can be associated with any consumer of a bitstream of encoded data, whether the bitstream is a non-scalable bitstream, scalable bitstream or multi-layer encoding (MLE) bitstream. The framework (201) of FIG. 2a shows a single encoder that produces a single bitstream. The frameworks (202, 203) support multiplexing/demultiplexing of multiple non-scalable bitstreams, multiple scalable bitstreams or a mix of scalable and non-scalable bitstreams.

In the framework (201) shown in FIG. 2a, the encoder (211) encodes input video (209) to produce a bitstream (223)

of encoded data compliant with the H.264 standard, SMPTE 421M standard, H.265/HEVC standard, another standard, or a proprietary format. The output bitstream (223) from the encoder (211) can be a non-scalable bitstream or scalable bitstream, which may provide for spatial, temporal and/or SNR scalability within the scalable bitstream. For example, in the context of the H.264 standard, a scalable bitstream complies with SVC sections of the H.264 standard. The H.264/SVC bitstream itself includes a non-scalable bitstream (sometimes called an H.264/AVC bitstream) for the base layer of the H.264/SVC bitstream. The encoder (211) can encode video for a videoconference, video telephone call, streaming over the Internet, or other use scenario.

The bitstream (223) is conveyed over a transport channel (230) using an appropriate communication protocol. The transport channel (230) can include the Internet or another computer network.

FIG. 2a shows "n" decoders (271, . . . , 27n). The number of decoders depends on implementation. Each decoder (271, . . . , 27n) decodes at least part of the bitstream (223) of encoded data, which is compliant with the H.264 standard, SMPTE 421M standard, H.265/HEVC standard, another standard, or a proprietary format. Depending on the type of decoder, the input bitstream for decoding can be a non-scalable bitstream or scalable bitstream.

The controller (222) is an encoding controller that communicates with the encoder (211). The encoding controller (222) can be part of the same computing system as the encoder (211) or part of another computing system. In general, the encoding controller (222) gets encoder capability data from the encoder (211) and advertises the capabilities of the encoder (211) to one or more controllers for decoding hosts. Sections III, IV and VII describe aspects of encoder capability advertisement.

The controller (252) is a decoding host controller that communicates with the decoder(s) (271, . . . , 27n). The decoding host controller (252) can be part of the same computing system as the decoder(s) (271, . . . , 27n) or part of another computing system. In general, the decoding host controller (252) gets the encoder capability data from the encoding controller (222) and creates stream configuration request data appropriate for the decoder(s) (271, . . . , 27n). The stream configuration request data can be set considering the computational capabilities, screen size or quality setting of a given decoder or decoders, or considering the network bandwidth between the encoder (211) and decoder(s) (271, . . . , 27n). The stream configuration request data are also set subject to the encoder capability data. The decoding host controller sends the configuration request data to the encoding controller (222), which uses the configuration request data to configure the encoder (211). Sections III, V and VII describe aspects of initial encoder configuration.

The decoding host controller (252) and encoding controller (222) can also exchange run-time control messages during streaming and playback of the bitstream. Such run-time control messages can be based upon feedback from one of the decoder(s) (271, . . . , 27n) to the decoding host controller (252). Sections III, VI and VII describe aspects of run-time control.

In the framework (202) shown in FIG. 2b, a multi-layer encoder (210) includes one or more video encoders as well as a bitstream multiplexer (MUX). Each encoder encodes input video (209) to produce a component bitstream of encoded data compliant with the H.264 standard, SMPTE 421M standard, H.265/HEVC standard, another standard, or a proprietary format. The output bitstream from an encoder can be a non-scalable bitstream or scalable bitstream, which may provide for spatial, temporal and/or SNR scalability within the scalable bitstream.

The multi-layer encoder (210) can include a single encoder used multiple times to encode different versions of video in different component bitstreams for simulcast transmission. Or, the multi-layer encoder (210) can include multiple encoders used to produce the respective component bitstreams in parallel. The multi-layer encoder (210) can encode video for a videoconference, video telephone call, streaming over the Internet, or other use scenario. The component bitstreams can differ from each other in terms of the number of layers of temporal, spatial and/or SNR scalability supported in the bitstream, if the bitstream is scalable at all. The component bitstreams can all use the same format, or different component bitstreams can use different formats. The component bitstreams can be encoded for the same profile and level of decoding, or different component bitstreams can be encoded for different profile and/or level of decoding to serve decoders with different capabilities.

The multi-layer encoder (210) multiplexes the component bitstreams together to form a multi-layer encoding (MLE) bitstream (221). In doing so, the multi-layer encoder (210) applies composition rules to facilitate demultiplexing and avoid contradictory assignments of values to parameters in the MLE bitstream (221). Example composition rules are described in U.S. patent application Ser. No. 13/235,217, filed Sep. 16, 2011, entitled "Multi-layer Encoding and Decoding," the disclosure of which is hereby incorporated by reference. In the context of the H.264 standard, an MLE bitstream can include multiple H.264/SVC bitstreams multiplexed together, multiple H.264/AVC bitstreams multiplexed together or a mix of H.264/AVC and H.264/SVC bitstreams multiplexed together.

The MLE bitstream DEMUX (250) receives the MLE bitstream (221) and demultiplexes at least part of a component bitstream (251) from it. The MLE DEMUX (250) applies decomposition rules in demultiplexing. The DEMUX (250) can be part of a multi-point conferencing unit in a videoconferencing system, network server that distributes streaming media, receiver, or other entity in a network environment. The operations of the DEMUX (250) depend on its role, as further detailed in U.S. patent application Ser. No. 13/235,217, which also describes example decomposition rules. In general, considering the computational capabilities, screen size or quality setting of a given decoder, or considering network bandwidth, the DEMUX (250) selects all or part of a component bitstream (251) that is appropriate in terms of bit rate, spatial resolution, frame rate or other quality level, for delivery to a decoder. Different decoders (271, 272, . . . , 27n) can thus receive different versions of the video from the MLE DEMUX (250). The number of decoders depends on implementation.

In FIG. 2b, the encoding controller (222) communicates with the multi-layer encoder (210). The encoding controller (222) can be part of the same computing system as the multi-layer encoder (210) or part of another computing system. In general, the encoding controller (222) gets encoder capability data from the multi-layer encoder (210) and advertises the capabilities of the encoders of the multi-layer encoder (210) to one or more controllers for decoding hosts, as further detailed in sections III, IV and VII.

The decoding host controller (252) communicates with the MLE DEMUX (250). The decoding host controller (252) can be part of the same computing system as the DEMUX (250) or part of another computing system. The decoding host controller (252) gets the encoder capability data from the encoding controller (222) and creates stream configuration request data appropriate for the decoder(s) (271, . . . , 27n), e.g., considering the computational capabilities, screen size or quality setting of a given decoder or decoders, or considering network bandwidth. The decoding host controller (252) sends the stream configuration request data to the encoding controller (222), which uses the configuration request data to configure the encoders of the multi-layer encoder (210). The decoding host controller (252) and encoding controller (222) can also exchange run-time control messages during streaming and playback of the bitstream, as explained with reference to FIG. 2a. See sections III and V-VII.

In FIG. 2c, the framework (203) includes one or more encoders (211, 212, . . . , 21n) apart from an MLE MUX (220). Each encoder encodes input video (209) to produce a component bitstream (219), which can be a non-scalable bitstream or scalable bitstream. The MLE MUX (220) receives the component bitstreams (219) and multiplexes them together to form an MLE bitstream (221). The transport channel (230), DEMUX (250) and decoder(s) (271, 272, . . . , 27n) in the framework (203) of FIG. 2c operate as in the framework (202) of FIG. 2b.

In FIG. 2c, the encoding controller (222) communicates with the MLE MUX (220). The encoding controller (222) can be part of the same computing system as the MUX (220) or part of another computing system. In general, the encoding controller (222) gets encoder capability data from the MUX (220) and advertises the capabilities of the encoders to one or more controllers for decoding hosts, as explained with reference to FIG. 2b. Alternatively, the encoding controller (222) communicates directly with the encoders (211, . . . , 21n). The decoding host controller (252) communicates with the MLE demultiplexer (250), as explained with reference to FIG. 2b.

III. Generalized Approach to Capability Advertisement, Configuration and Control Features of encoder capability advertisement, encoder configuration and run-time control are provided in a framework that supports a wide range of encoders with different capabilities. The encoders can use scalable video coding and/or non-scalable video coding. The encoders potentially target various applications and scenarios, from low-end mobile phone video chat, up to high-end telepresence systems. FIG. 3 shows an example approach (300) to encoder capability advertisement, encoder configuration and run-time control for video coding and decoding.

As part of a capability advertisement stage, a controller for a decoding host creates a request for encoder capability data and sends the request to an encoding controller. The encoding controller determines encoder capability data and provides the encoder capability data to the decoding host controller. In one implementation, the encoder capability data are formatted and requested using the structures, call signatures and call flows explained with reference to FIGS. 10, 11a and 11b. Alternatively, the encoder capability data are formatted and/or requested in another way, or the encoder capability data have fields other than or in addition to the fields shown in FIGS. 11a and 11b.

As part of a configuration stage, the decoding host controller processes the encoder capability data received from the encoding controller. The decoding host controller creates stream configuration request data appropriate for the decoder(s) in question, subject to the capabilities indicated in the encoder capability data. The decoding host controller provides the configuration request data to the encoding controller. The encoder controller uses it to configure the encoder(s) and allocate resources for encoding, and also acknowledges receipt of the configuration request data. In one implementation, the stream configuration request data are formatted and sent using the structures, call signatures and call flows explained with reference to FIGS. 10, 12a and 12b. Alternatively, the stream configuration request data are formatted and/or sent in another way, or the stream configuration request data have fields other than or in addition to the fields shown in FIGS. 12a and 12b.

The encoder then starts encoding and streaming, and the decoder starts decoding and playback. As part of the run-time control stage, during decoding, the decoding host control can create a control message and send it to the encoding controller. The encoding controller processes the run-time control message appropriately, and also acknowledges receipt of the run-time control message. In one implementation, run-time control messages are formatted and sent using the structures, call signatures and call flows explained with reference to FIGS. 10 and 13a-13g. Alternatively, run-time control messages are formatted and/or sent in another way, or run-time control messages other than or in addition to the messages shown in FIGS. 13b-13g are used. The decoding host controller can then create and send other run-time control messages. Such messages are processed by the encoding controller, which continues streaming.

IV. Generalized Approach to Encoder Capability Advertisement

Figure 4:
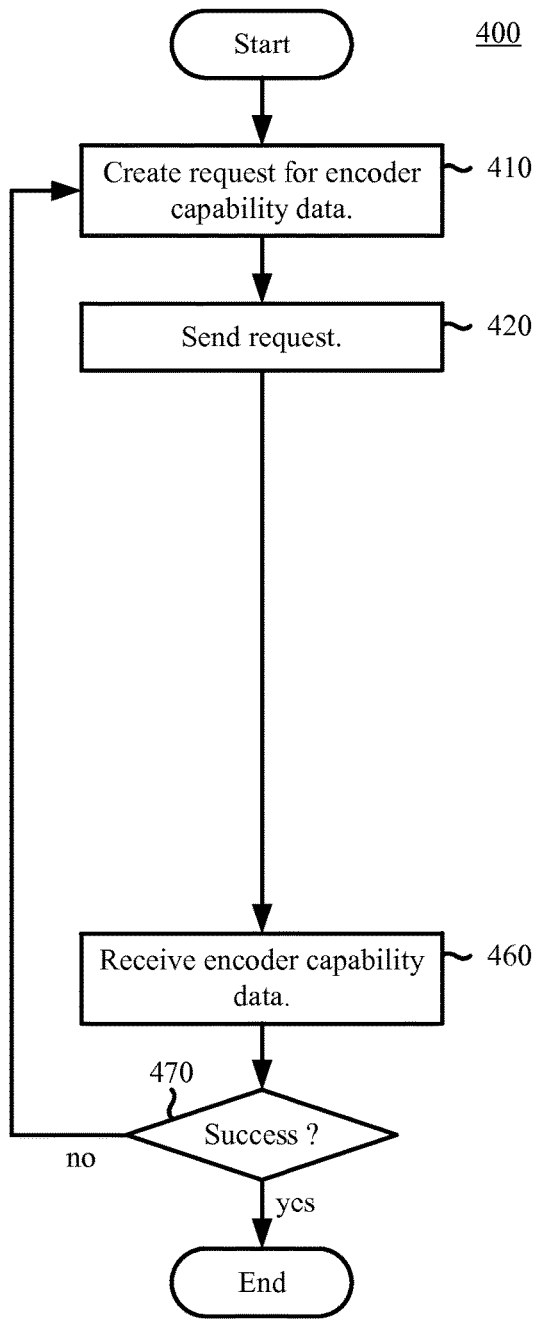
FIGS. 4 and 5 are flowcharts illustrating generalized techniques for capability advertisement from the perspectives of a decoding host controller and an encoding controller.
Figure 5:
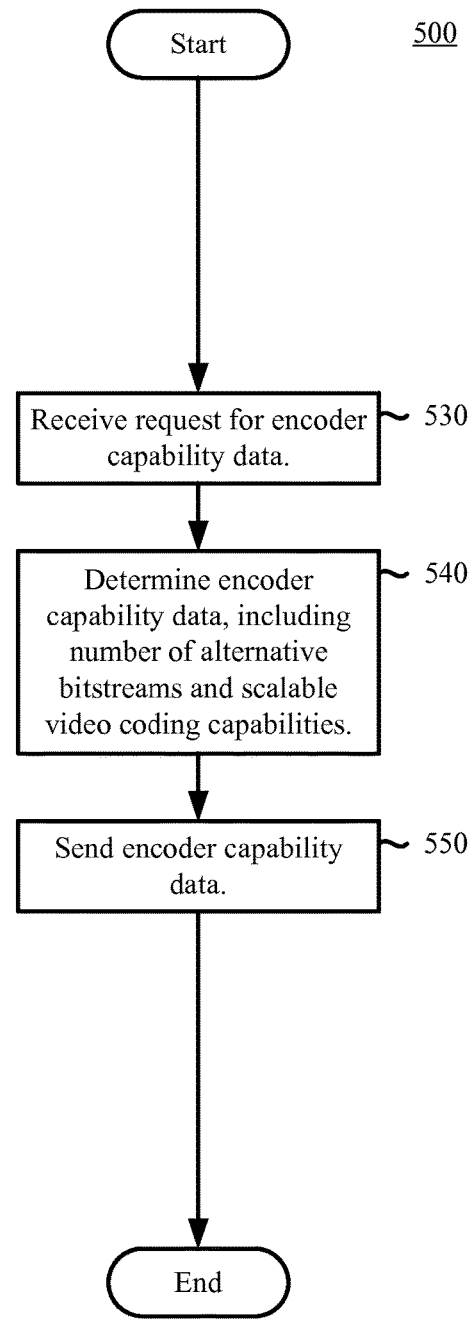

FIG. 4 illustrates a generalized technique (400) for encoder capability advertisement from the perspective of a decoding host controller. A decoding host controller such as the decoding host controller (252) of FIGS. 2a-2c, or other decoding host controller, performs the technique (400). FIG. 5 illustrates a generalized technique (500) for encoder capability advertisement from the perspective of an encoding controller. An encoding controller such as the encoding controller (222) of FIGS. 2a-2c, or other encoding controller, performs the technique (500).

To start, the decoding host controller creates (410) a request for encoder capability data and sends (420) the request (e.g., as part of a function call) to the encoding controller. For example, the request for encoder capability data is formatted and sent using the structures, call signatures and call flows explained with reference to FIGS. 10, 11a and 11b. Alternatively, the request is formatted and/or sent in another way.

The encoding controller receives (530) the request for encoder capability data and determines (540) the encoder capability data. The encoder capability data can include one or more of the following.

(1) Data that indicate a number of alternative bitstreams, each providing an alternative version of the input video. For example, the number of bitstreams is a maximum number of bitstreams that can be encoded for simulcast. Each of the bitstreams can be encoded as a scalable bitstream or non-scalable bitstream.

(2) Data that indicate scalable video coding capabilities for encoding of the bitstreams. For example, the scalable video coding capabilities apply for all of the bitstreams. Alternatively, different scalable video coding capabilities are indicated for different bitstreams. FIG. 11a shows an example structure (1101) for indicating scalable video coding capabilities. Alternatively, capability data have different and/or additional fields.

(3) Data that indicate computational limits for the encoding of the bitstreams. For example, the computational limits are parameterized in terms of macroblocks per second. The computational limits can be organized in an array having multiple indices, including a first index for number of spatial resolutions and a second index for degree of scalability. For example, the array is an array of maximum macroblock processing rates having indices i and j, as explained in section VII. Alternatively, the computational limits are parameterized and/or organized in some other way.

(4) Data that indicate spatial resolution and/or frame rate of the input video.

Alternatively, the encoder capability data include other and/or additional data.

The encoding controller then sends (550) the encoder capability data (e.g., as part of a return for a function call). The decoding host controller receives (460) the encoder capability data and processes it. The decoding host controller evaluates (470) whether the encoder capability data has been successfully provided. If so, the decoding host controller can continue to the encoder configuration phase. Otherwise, the decoding host controller creates (410) another request for encoder capability data and again attempts to get encoder capability data.

V. Generalized Approach to Initial Encoder Configuration

Figure 6:
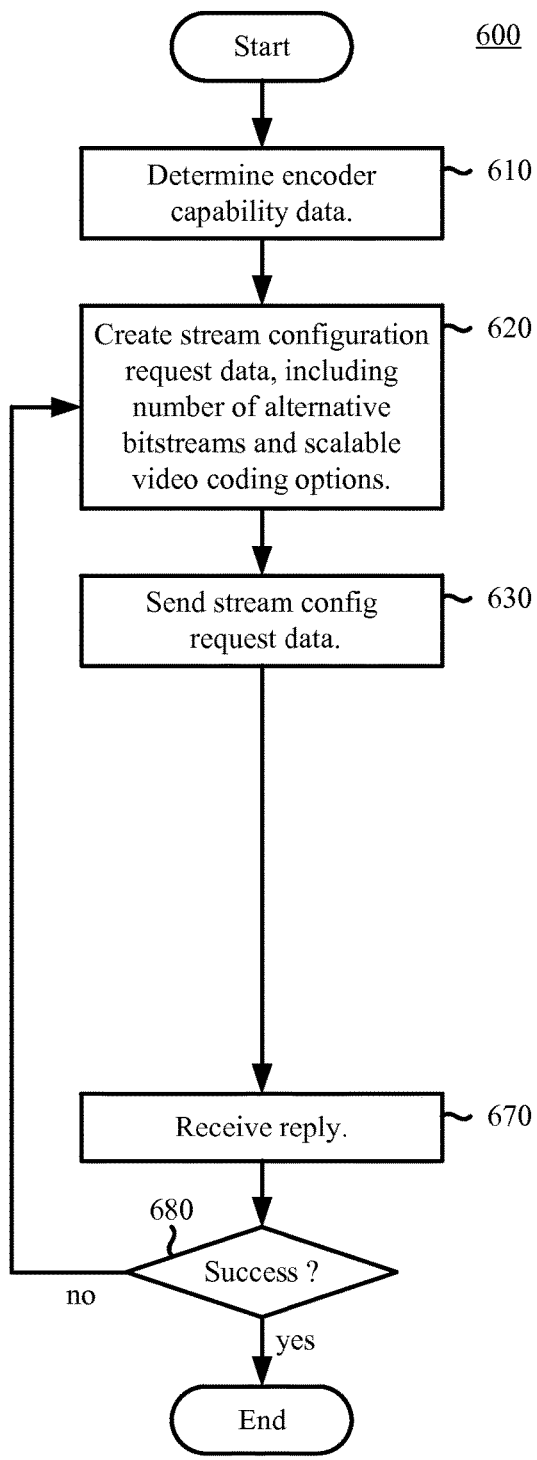
FIGS. 6 and 7 are flowcharts illustrating generalized techniques for encoder configuration from the perspectives of a decoding host controller and an encoding controller.
Figure 7:
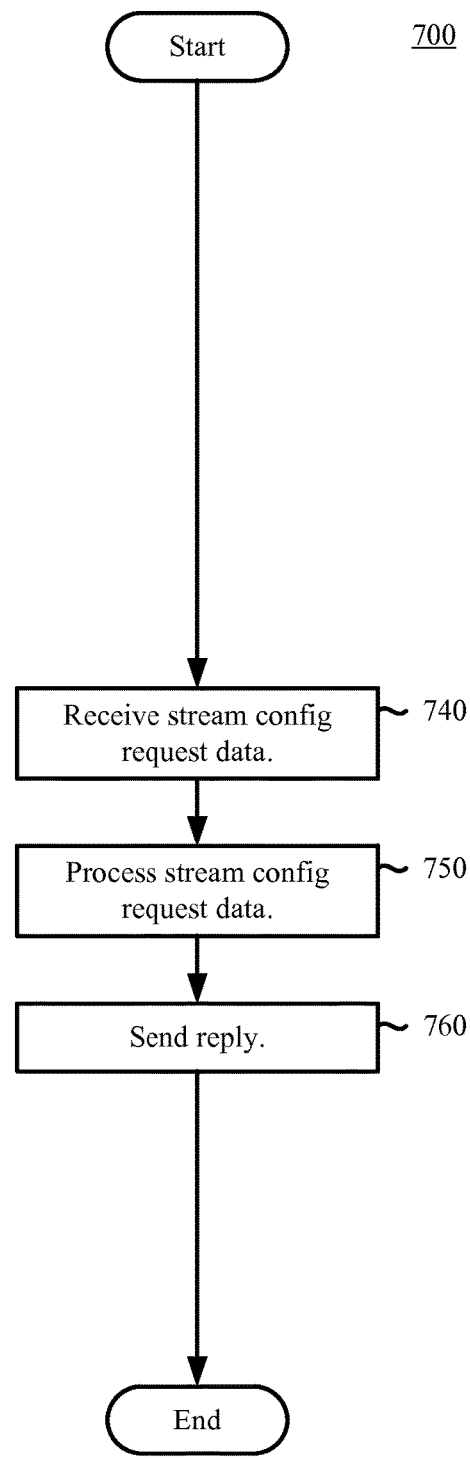

FIG. 6 illustrates a generalized technique (600) for encoder configuration from the perspective of a decoding host controller. A decoding host controller such as the decoding host controller (252) of FIGS. 2a-2c, or other decoding host controller, performs the technique (600). FIG. 7 illustrates a generalized technique (700) for encoder configuration from the perspective of an encoding controller. An encoding controller such as the encoding controller (222) of FIGS. 2a-2c, or other encoding controller, performs the technique (700).

To start, the decoding host controller determines (610) encoder capability data. For example, the decoding host controller receives the encoder capability data from an encoding controller as described with reference to FIGS. 4 and 5. Alternatively, the decoding host controller determines the encoder capability data in some other way, e.g., retrieving the encoder capability data from archived storage.

The decoding host controller then creates (620) stream configuration request data based at least in part on the encoder capability data. The stream configuration request data can include one or more of the following.

(1) Data that indicate a number of alternative bitstreams, each providing an alternative version of the input video. For example, the number of bitstreams is a target number of bitstreams to be encoded for simulcast. Each of the bitstreams can be encoded as a scalable bitstream or non-scalable bitstream.

(2) Data that indicate scalable video coding options for the bitstreams. The scalable video coding options are indicated separately for each of the bitstreams. Alternatively, scalable video coding options can be indicated collectively for at least some of the bitstreams. The data that indicate the scalable video coding options can include, for each of the bitstreams, one or more of: (a) spatial resolution for a base layer of the bitstream, (b) number of temporal enhancement layers of the bitstream, (c) one or more attributes for SNR enhancement layers at the spatial resolution for the base layer of the bitstream, and (d) for each of the bitstreams, for an additional enhancement layer of the bitstream, an upscaling ratio to reach a spatial resolution for the additional enhancement layer and one or more attributes of SNR enhancement layers at the spatial resolution for the additional enhancement layer.

(3) Data that indicate a target spatial resolution and/or frame rate.

Alternatively, the stream configuration request data include other and/or additional data.

The stream configuration request data can also be based at least in part on data that indicate computational limits for encoding. For example, the data that indicate computational limits for encoding are maximum macroblock processing rates. Alternatively, the data that indicate computational limits take another form.

The decoding host controller sends (630) the stream configuration request data (e.g., as part of a function call) to the encoding controller. For example, the stream configuration request data are formatted and sent using the structures, call signatures and call flows explained with reference to FIGS. 10, 12a and 12b. Alternatively, the stream configuration request data are formatted and/or sent in another way.

The encoding controller receives (740) the stream configuration request data and processes (750) it. For example, the encoding controller configures one or more encoders and allocates resources such as memory buffers for encoding. The encoder can then start streaming with the encoder(s).

The encoding controller sends (760) a reply (e.g., as part of a return for a function call). The decoding host controller receives (670) the reply and processes it. The decoding host controller evaluates (680) whether the encoder configuration succeeded. If so, the decoding host controller can continue to the run-time control phase. Otherwise, the decoding host controller creates (620) new stream configuration request data and again attempts to initialize the encoder.

VI. Generalized Approach to Run-Time Control

Figure 8:
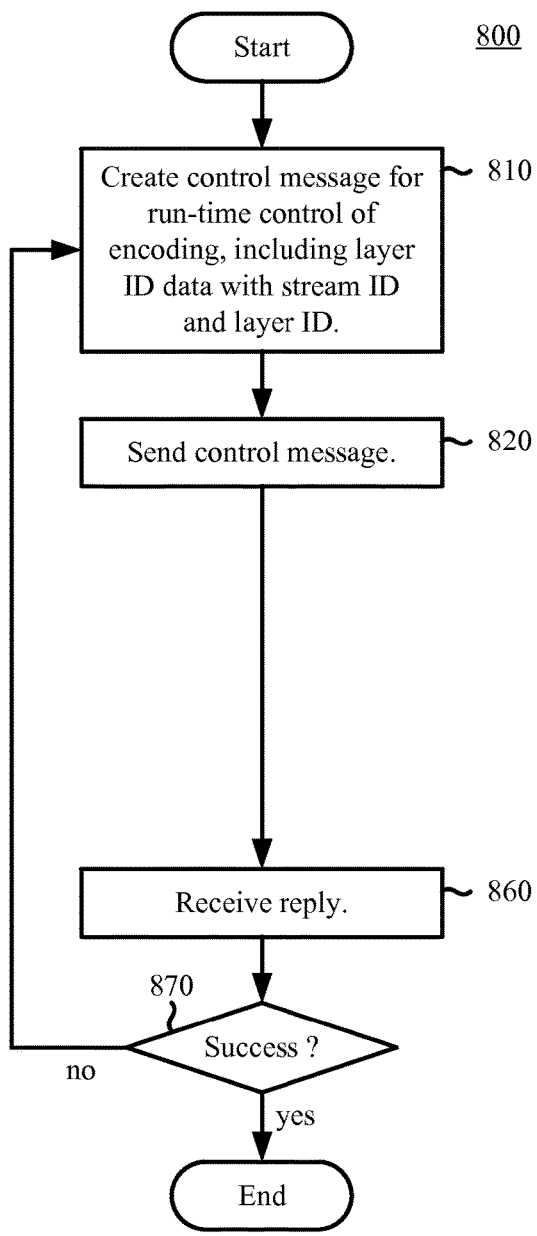
FIGS. 8 and 9 are flowcharts illustrating generalized techniques for signaling run-time control messages from the perspectives of a decoding host controller and an encoding controller.
Figure 9:
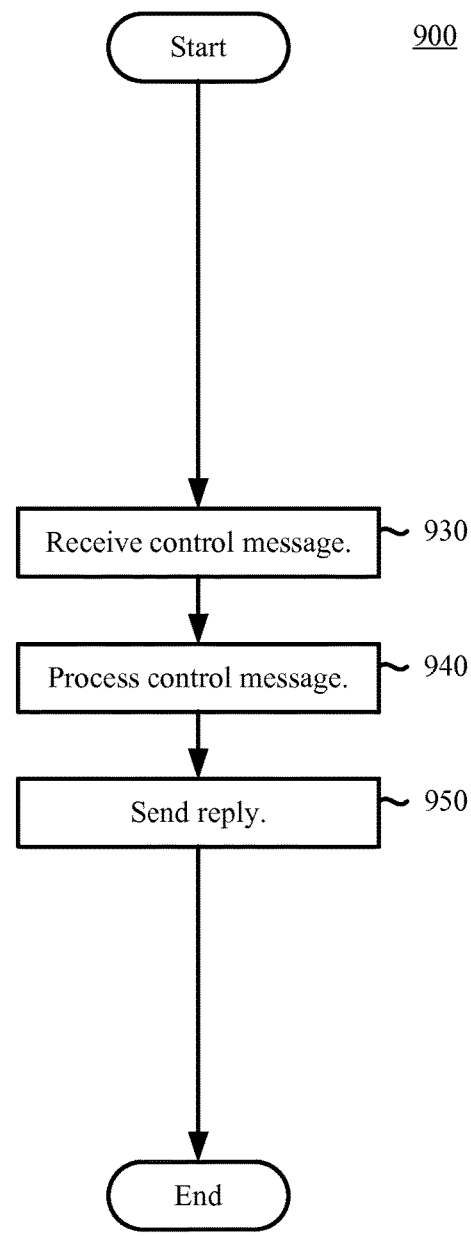

FIG. 8 illustrates a generalized technique (800) for signaling run-time control messages from the perspective of a decoding host controller. A decoding host controller such as the decoding host controller (252) of FIGS. 2a-2c, or other decoding host controller, performs the technique (800). FIG. 9 illustrates a generalized technique (900) for signaling run-time control messages from the perspective of an encoding controller. An encoding controller such as the encoding controller (222) of FIGS. 2a-2c, or other encoding controller, performs the technique (900).

During decoding of encoded video data of a bitstream, a decoding host controller creates (810) a run-time control message for control of encoding for the bitstream. Such run-time control can use commands specified for a particular layer of a bitstream, in which case the control message indicates which layer is controlled/changed. For this purpose, the control message can include layer identifier data, which in turn can include a stream identifier of the bitstream and at least one layer identifier of a given layer of the bitstream. For example, the layer identifier data are formatted using the structure explained with reference to FIG. 13a, which includes a stream identifier and three different types of layer identifiers. Alternatively, the layer identifier data use another format.

The decoding host controller sends (820) the control message (e.g., as part of a function call) to an encoding controller. For example, the control message is formatted and sent using the structures, call signatures and call flows explained with reference to FIGS. 10 and 13b-13g. Alternatively, the control message is formatted and/or sent in another way.

The control message can be a request to insert a synchronization picture for the given layer, a request to change spatial resolution for the given layer, a request to set a priority identifier for the given layer, a request to set quantization parameters and/or rate control parameters for the given layer, a request to start streaming of a subset of the bitstream, a request to stop streaming of a subset of the bitstream, or some other type of control message. When the control message is a request to start streaming a subset of the bitstream, the subset can include encoded video data for the given layer and any layers upon which the given layer depends. When the control message is a request to stop streaming a subset of the bitstream, the subset can include encoded video data for the given layer and any higher layers.

The encoding controller receives (930) the run-time control message and processes (940) it, in a way that depends on the type of control message, and if such processing is feasible. For example, the encoding controller causes an encoder to insert a synchronization picture for the given layer, change spatial resolution for the given layer, set quantization parameters and/or rate control parameters for the given layer, or make some other change. Or, the encoding controller causes an encoder or multiplexer to set a priority identifier for the given layer, start streaming of a subset of the bitstream, stop streaming of a subset of the bitstream, or perform some other action.

The encoding controller then sends (950) a reply (e.g., as part of a return from a function call). The decoding host controller receives (860) the reply and processes it. The decoding host controller evaluates (680) whether the run-time control succeeded. If so, the decoding host controller can continue the run-time control phase, possibly restarting the technique (800) for another control message. Otherwise, the decoding host controller creates (810) the control message again for another attempt at the run-time control operation.

VII. Capability Advertisement, Configuration and Control in Example Implementation In an example implementation, features of encoder capability advertisement, encoder configuration and run-time control are provided in a framework that supports a wide range of hardware and software H.264 encoders with different capabilities. The H.264 encoders can use scalable video coding (that is, H.264/SVC) and/or non-scalable video coding (that is, H.264/AVC). In the example implementation, the framework uses a tiered approach from low to high capabilities that is designed to allow these different encoders to be used in a unified video system. The framework supports a variety of frame rates and spatial resolutions. For additional details about the framework in the example implementation, see U.S. patent application Ser. No. 13/235,217.

Figure 10:
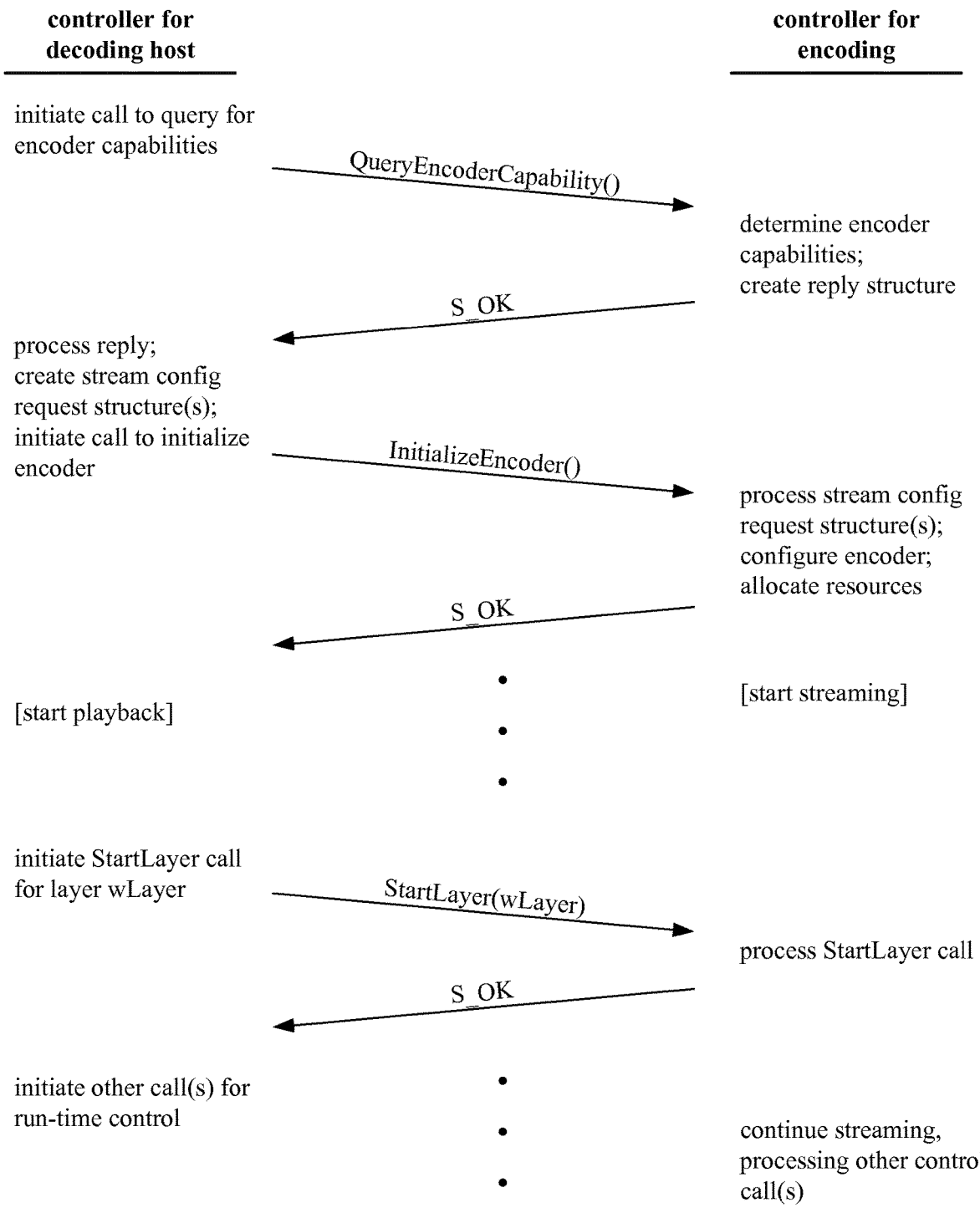
FIG. 10 is a protocol diagram illustrating an example approach to capability advertisement, encoder configuration and run-time control for video coding and decoding.

FIG. 10 shows an example approach (1000) to capability advertisement, configuration and run-time control for video coding and decoding in the example implementation.

As part of a capability advertisement stage, a controller for a decoding host initiates a call to query an encoding controller for encoder capabilities. In FIG. 10, the decoding host controller calls a function QueryEncoderCapability( ) of an interface. FIG. 11b shows a function signature (1102) for the function QueryEncoderCapability( ) The encoding controller determines encoder capabilities and creates a reply structure. FIG. 11a shows an example structure (1101) that indicates encoder capabilities, including maximum number of simulcast streams, H.264/SVC capabilities, computational capabilities and input video characteristics. The encoding controller provides a reply (e.g., S_OK indicating success, or a different value indicating failure) along with the structure indicating encoder capabilities.

As part of a configuration stage, the decoding host controller processes the reply (including the structure that indicates encoder capabilities). The decoding host controller creates a stream configuration request structure. FIG. 12a shows an example stream configuration request structure (1201) for a bitstream. For simulcast streams, the decoding host controller can create a structure (1201) per bitstream. The stream configuration request is subject to both H.264/SVC capabilities of the encoder and computational capabilities of the encoder. The possible combinations of number of simulcast streams, number of scalability layers, frame rates and spatial resolutions are subject to limits on encoder processing capabilities, which may be expressed in terms of maximum macroblock processing rates. Typically, the relevant total is the sum of macroblocks per second for the highest quality layer across the streams.

The decoding host controller initiates a call to initialize the encoder. In FIG. 10, the decoding host controller calls a function InitializeEncoder( ) FIG. 12b shows a function signature (1202) for the function InitializeEncoder( ) The encoding controller processes the stream configuration request structure(s). If possible, the encoding controller configures the encoder accordingly and allocates resources such as memory buffers for encoding. The encoding controller provides a reply (e.g., S_OK indicating success, or a different value indicating failure). The encoder then starts encoding and streaming, and the decoder starts decoding and playback.

As part of the run-time control stage, during the encoding/decoding, the decoding host controller initiates a call to an appropriate function of the interface. In FIG. 10, the decoding host controller initiates a call to the StartLayer( ) function. FIG. 13f shows a function signature (1306) for the StartLayer( ) function. The StartLayer( ) function has a parameter that represents a layer of the bitstream that is affected for the function call. FIG. 13a shows a structure (1301) for a layer identifier. FIGS. 13b-13e and 13g show signatures for other function calls for run-time control. The encoding controller processes the function call, taking appropriate action if possible. The encoding controller then provides a reply (e.g., S_OK indicating success, or a different value indicating failure). The decoding host controller can then initiate other calls for run-time control, which are processed by the encoding controller.

A. Capability Advertisement Structures and Function Signatures

FIG. 11b shows the function signature (1102) for QueryEncoderCapability( ). This is the main function for query/reply between controllers for the decoding host and encoding in the example implementation. The function signature (1102) includes a first field that indicates a maximum number of simulcast streams. Each stream can be an H.264/AVC bitstream or H.264/SVC bitstream.

The next field in the function signature (1102) has a type of H264SVCCapability and indicates the maximum encoder capabilities and options for an H.264/SVC bitstream. FIG. 11a shows a structure (1101) used to indicate H.264/SVC capabilities of an encoder during the capability advertisement phase. Using the structure (1101), an encoder can advertise its H.264/SVC capabilities for any H.264/SVC bitstream. The capabilities can apply for all streams when multiple simulcast streams are supported, but computational limits still apply. (Full scalability options might not be possible for all streams, due to limits on computational capacity of the encoder.)

In the structure (1101), the field MaxNumOfTemporalEnhancementLayers indicates the maximum number of temporal enhancement layers in a bitstream. The field has 3 bits, as indicated by the number 3 in the structure (1101). A non-zero value of this field indicates the encoder supports the creation of temporal scalable bitstreams formed in a hierarchical prediction structure. For example, an encoder can produce an H.264/SVC bitstream using a hierarchical P-picture prediction structure to achieve temporal scalability. In this case, a frame in a temporal enhancement layer uses the immediate previously reconstructed frame in the lower layer as a reference frame. Thus, each layer represents a temporal scale. A value of temporal_id can specify the hierarchical dependency of a temporal layer relative to other layers, with 0 representing the base temporal layer, 1 the first temporal enhancement layer, 2 the second temporal enhancement layer, and so forth.

The single-bit field RewriteSupport indicates whether the encoder supports the creation of quality scalable bitstreams that can be converted into bitstreams that conform to one of the non-scalable H.264/AVC profiles by using a low-complexity rewriting process.

The next fields of the structure (1101) relate to support for SNR scalability. According to the H.264/SVC standard, an encoder can use coarse-grained scalability ("CGS") and medium-grained scalability ("MGS") in a single bitstream. Typically, however, it suffices for an encoder to use either CGS or MGS for a given bitstream.

The three-bit field MaxNumOfCGSEnhancementLayers indicates the maximum number of CGS quality enhancement layers in a bitstream. A non-zero value of this field indicates the encoder supports the creation of CGS quality scalable bitstreams. The field MaxNumOfMGSSublayers indicates the maximum number of MGS sub-layers allowed in an MGS enhancement layer in a bitstream. A non-zero value of this field indicates the encoder supports the creation of MGS quality scalable bitstreams with sub-layering. Key frame generation is supported when MGS is supported. The field AdditionalSNRScalabilitySupport indicates whether additional SNR layers are allowed to be present in a spatial enhancement layer. When this field is 1, additional SNR scalability may be introduced in a way that follows the quality capability specified for the base spatial layer. That is, the introduction of SNR enhancement layers in a spatial enhancement layer is constrained by the values of the fields MaxNumOfCGSEnhancementLayers and MaxNumOfMGSSublayers. Also, the rewrite mode is disabled in any spatial resolution enhancement layers.

Finally, the three-bit field MaxNumOfSpatialEnhancementLayers indicates the maximum number of spatial enhancement layers supported in a bitstream. A non-zero value of this field indicates the encoder supports the creation of spatial scalable bitstreams. The remaining bits are reserved in the structure (1101) of FIG. 11a.

Returning to FIG. 11b, the function signature (1102) includes fields that indicate the computational limits for streams produced by the encoder, in aggregate. The field pwMaxMacroblockProcessingRateArraySize indicates the size of the array in the next field pdwMaxMacroblockProcessingRate. For a particular layering layout for streams encoded by the encoder, the feasible combinations of spatial resolutions and frame rates are bounded by computational limits of the encoder. The computational limits are represented with maximum macroblock processing rates organized in a two-dimensional array:
    unsigned int MaxMacroblockProcessingRate[i][j].
The array is organized by two indices i and j to account for the cost for spatial resolution re-scaling and degree of scalable coding. The index i indicates the number of spatial resolution re-scaling stages (or, equivalently, the number of spatial resolutions across all scalable layers minus 1). Thus, the index i can account for different spatial resolutions within one bitstream and/or different spatial resolutions among simulcast bitstreams. Generally, the higher the number of re-scaling stages or different spatial resolutions, the smaller the possible macroblock processing rate. The index j indicates the degree of scalability—a value 0 means no scalability; a value 1 means temporal scalability only; a value 2 means temporal and SNR scalability; and a value 3 means temporal, SNR and spatial scalability. Generally, the higher the degree of scalability, the smaller the possible macroblock processing rate.

In FIG. 11b, the remaining fields of the function signature (1102) indicate the maximum source resolution and frame rate for the input video. The maximum input resolution and frame rate are specified by three variables pwMaxInputWidth, pwMaxInputHeight, and pdwMaxInputFrameRate. Other fields may follow in the function signature (1102).

B. Initial Configuration Structures and Function Signatures

After the controller for the decoding host receives the encoder capability data, the decoding host controller can determine one or more feasible and appropriate layering structures for the respective stream(s), along with spatial resolutions and frame rates at the respective layers. With these structure(s), the decoding host controller can specify a particular stream configuration to the encoding controller.

1. Setting Per Stream Configuration Structures

FIG. 12a shows a structure (1201) of type H264SVCStreamLayout with fields that indicate spatial resolutions and layering structure for a given bitstream. In the structure (1201), the first fields indicate spatial resolution of the base layer. The field BaseOutputWidth indicates the width in pixels of the base spatial layer. The field BaseOutputHeight indicates the height in pixels of the base spatial layer. The values for width and height do not exceed the width and height specified in the encoder capability signature (1102).

The three-bit field NumberOfTemporalEnhancementLayers indicates the number of temporal enhancement layers in the stream. This value effectively corresponds to the values of syntax element temporal_id in H.264/SVC. For example, if this field is 2, three temporal layers, corresponding to temporal_id 0, 1, and 2 are present in the bitstream. The value of this field does not exceed the maximum number of temporal layers specified in the H.264/SVC capability structure (1101).

The remaining fields of the configuration structure (1201) are organized according to spatial base layer and $1^{st}$, $2^{nd}$ and $3^{rd}$ spatial enhancement layers. The structure (1201) shown in FIG. 12a assumes the encoder supports at most four spatial enhancement layers, but a bitstream can have fewer spatial layers (e.g., only spatial base layer, or only spatial base layer and one spatial enhancement layer). For the remaining fields in the structure (1201), the values permitted are subject to the constraints indicated in the encoder capability data, in particular the H.264/SVC capability structure (1101).

In the structure (1201), the next fields indicate SNR scalability attributes for the spatial base layer. The single-bit field SNRModeBase indicates whether CGS or MGS is used to generate quality layers in the spatial base layer. The value 0 means CGS is used, and the value 1 means MGS is used.

When CGS is used according to SNRModeBase, SNRModeAttributeBase (1 bit) indicates whether a rewriting process is enabled (0 means rewriting is not used, and 1 means rewriting is used). The two-bit field NumberOfSNREnhancementLayersBase indicates the number of CGS quality enhancement layers in the spatial base layer. When the value of this field is 0, it means no SNR scalability is introduced in the spatial base layer. A non-zero value effectively corresponds to the values of the syntax element dependency_id in H.264/SVC. For example, if the value of this field is 2, three CGS layers (corresponding to dependency_id 0, 1, and 2) are present in the spatial base layer in the bitstream.

When MGS is used according to SNRModeBase, SNRModeAttributeBase indicates whether key frame generation is enabled (0 means key frame generation is disabled, and 1 means it is enabled). The field NumberOfSNREnhancementLayersBase indicates the number of MGS sub-layers in the spatial base layer. When the value of this field is 0, it means no SNR scalability is introduced in the spatial base layer, as noted above for the CGS case. A non-zero value effectively corresponds to the values of the syntax element quality_id in H.264/SVC. For example, if the value of this field is 3, three MGS sub-layers (corresponding to quality_id 1, 2, and 3) are present in the spatial base layer in the bitstream. (That is, quality_id value 0 corresponds to the base quality layer, and quality_id values 1, 2, and 3 correspond to sub-layers in the MGS enhancement layer.)

The three-bit field NumberOfSNRLayers1st indicates whether spatial scalability is introduced in the bitstream and whether and how additional SNR scalability is used. When the value of NumberOfSNRLayers1st is 0, spatial scalability is not introduced in the bitstream. When the value of this field is 1, spatial scalability is used, but no additional SNR scalability is introduced in the 1$^{st}$ spatial enhancement layer. When the value of this field is 2 or larger, spatial scalability is used and additional SNR scalability is also introduced in the 1$^{st}$ spatial enhancement layer. In the last case, depending on the value of SNRMode1st, the value of NumberOfSNRLayers1st indicates the number of CGS quality layers or MGS sub-layers used in the 1$^{st}$ spatial enhancement layer. When the value of NumberOfSNRLayers1st is non-zero, the maximum number of spatial layers advised by the encode capability data is at least 2. When the value of NumberOfSNRLayers1st is larger than 1, the use of additional SNR scalability does not exceed that specified in the encoder capability data.

In the configuration structure (1101), the field SNRMode1st (1 bit) indicates whether CGS or MGS is used to generate additional quality layers in a 1$^{st}$ spatial enhancement layer, if present. The value 0 means CGS is used, and the value 1 means MGS is used.

When CGS is used according to SNRMode1st, the field SNRModeAttribute1st (1 bit) indicates whether the rewriting process is enabled (0 means rewriting is not used; 1 means it is used). The value of NumberOfSNRLayers1st effectively corresponds to the values of the syntax element dependency_id in H.264/SVC. For example, if the value of this field is 3, three CGS layers (corresponding to dependency_id K+1, K+2, and K+3) are present in the 1$^{st}$ spatial enhancement layer in the bitstream, where K is 0 if SNRModeBase is 1 and K is NumberOfSNREnhancementLayersBase if SNRModeBase is 0.

When MGS is used according to SNRMode1st, the field SNRModeAttribute1st indicates whether key frame generation is enabled (0 means key frame generation is disabled; 1 means it is enabled). The value of NumberOfSNRLayers1st effectively corresponds to the values of the syntax element quality_id in H.264/SVC. For example, if the value of this field is 3, three MGS sub-layers (corresponding to quality_id 1, 2, and 3) are present in the 1$^{st}$ spatial enhancement layer in the bitstream.

The field UpscaleRatio1st (1 bit) indicates the resolution upscale ratio of the 1$^{st}$ spatial enhancement layer with respect to the base spatial layer. Two resolution upscale ratios are supported. A value of 0 means the upscaling ratio is 2, and a value of 1 means the ratio is 1.5.

In the configuration structure (1101), the fields SNRMode2nd and SNRMode3rd have the same meaning as the field SNRMode1st but relate to the 2$^{nd}$ and 3$^{rd}$ spatial enhancement layers, if present. The same applies for SNRModeAttribute2nd, UpscaleRatio2nd, SNRModeAttribute3rd and UpscaleRatio3rd.

The two-bit field NumberOfSNRLayers2nd indicates whether the 2$^{nd}$ spatial enhancement layer is introduced in the bitstream and, if so, whether additional SNR scalability is used. When this field is 0, the 2$^{nd}$ spatial enhancement layer is not introduced in the bitstream. When the value of this field is 1, the 2$^{nd}$ spatial enhancement layer exists, but no additional SNR scalability is introduced. When the value of this field is 2 or larger, additional SNR scalability is introduced in the 2$^{nd}$ spatial enhancement layer. In the last case, depending on the value of SNRMode2nd, the value of NumberOfSNRLayers2nd indicates the number of CGS quality layers or MGS sub-layers used in the 2$^{nd}$ spatial enhancement layer. When the value of NumberOfSNRLayers2nd is non-zero, NumberOfSNRLayers1st is also non-zero and the maximum number of spatial layers advised by the encode capability data is at least 3. When the value of this field is larger than 1, the use of additional SNR scalability does not exceed that specified in the encoder capability data.

When CGS is used according to SNRMode2nd, NumberOfSNRLayers2nd effectively corresponds to the values of the syntax element dependency_id in H.264/SVC. For example, if the value of this field is 3, three CGS layers (corresponding to dependency_id K+1, K+2, and K+3) are present in the 2nd spatial enhancement layer in the bitstream, where (a) K is 1 if both SNRModeBase and SNRMode1st are 1, (b) K is NumberOfSNREnhancementLayersBase+1 if SNRModeBase is 0 but SNRMode1st is 1, and (c) K is NumberOfSNRLayers1st if SNRModeBase is 1 but SNRMode1st is 0.

When MGS is used according to SNRMode2nd, NumberOfSNRLayers2nd effectively corresponds to the values of syntax element quality_id in H.264/SVC. For example, if the value of this field is 3, three MGS sub-layers (corresponding to quality_id 1, 2, and 3) are present in the 2$^{nd}$ spatial enhancement layer in the bitstream.

NumberOfSNRLayers3rd is defined in a similar way for the 3$^{rd}$ spatial enhancement layer.

2. Checking that Configuration is Computationally Tractable

In general, the controller for the decoding host can pick any combination of resolutions/frame rates for a particular layering structure, so long as the selected resolution and frame rate do not exceed the resolution and frame rate of the source or exceed the maximum values advised by the encoding controller, and so long as the aggregate macroblock processing rate does not exceed the relevant value indicated by the encoding controller. The aggregate macroblock processing rate for a given layer depends on the frame rate and spatial resolution for the given layer, and also depends on the frame rate and spatial resolution for layers used in reconstruction of the given layer.

For example, suppose layer A is 360p video with spatial resolution of 640×360 at 15 frames per second. The macroblock processing rate for layer A is:

$$ceil\left(\frac{640}{16}\right) \times ceil\left(\frac{360}{16}\right) \times 15 = 13800 \text{ macroblocks per second,}$$

where ceil( ) is a function that rounds up a fractional value to the next highest integer value.

Suppose layer B is 720p video with spatial resolution of 1280×720 at 30 frames per second. The macroblock processing rate for layer B by itself is:

$$ceil\left(\frac{1280}{16}\right) \times ceil\left(\frac{720}{16}\right) \times 30 = 108000 \text{ macroblocks per second.}$$

Layer A could be an H.264/AVC bitstream, and layer B could be a separate H.264/AVC bitstream for simulcast coding for the same input video. If layer A provides base layer video for an H.264/SVC bitstream, and layer B provides spatial and temporal scalability for the H.264/SVC bitstream, the aggregate macroblock processing rate is 13800+108000=121800 macroblocks per second.

In this example, the H.264/SVC bitstream includes one spatial resolution re-scaling stage (re-scaling by a factor of 2 horizontally and vertically, from 640×360 to 1280×720). For the array MaxMacroblockProcessingRate[i][j], the value of index i is 1. The H.264/SVC bitstream uses temporal and spatial scalability, so the value of index j is 3.

The decoding host controller computes the macroblock processing rate for the configuration that it has specified using the configuration structures (1201), then compares that macroblock processing rate to the maximum value for the appropriate values of i and j to confirm that the configuration is within the applicable computational limit specified in the encoder capability data. If the configuration exceeds the applicable computational limit, the decoding host controller can adjust the spatial resolution, frame rate and/or layering structure for the configuration to reduce the expected computational cost.

If the configuration includes a single bitstream, the values for the indices i and j depend on the number of spatial resolution re-scaling stages and degree of scalability for that one bitstream. If the configuration includes multiple bitstreams, conservatively, the decoding host controller can use the highest applicable values for the indices i and j. Also, the decoding host can count different simulcast streams at different spatial resolutions as re-scaling operations, since these affect the computational cost for the encoder. For example, when the configuration includes two simulcast streams having different spatial resolutions, and neither bitstream uses spatial scalability within that bitstream, the decoding host controller can set the value of the index i to 1. If one of the simulcast streams also uses spatial scalability within the bitstream, the decoding host controller can increment the value of the index i appropriately to account for the re-scaling operations.

3. Initializing Encoder with Configuration Data

FIG. 12b shows the function signature (1202) for InitializeEncoder( ) which is the main function that the decoding host controller uses to provide configuration data to the encoding controller in the example implementation. The function signature (1202) includes the fields wInputWidth and wInputHeight that indicate a target spatial resolution for input video. The function signature (1202) then includes a field wNumOfSimulcastStreamsMinus1 that indicates the number of simulcast streams in the configuration request, where each simulcast stream provides an alternative version of the input video. This field is followed by a per stream layout configuration of type H264SVCStreamLayout for each of the simulcast streams.

Typically, a stream configuration request within the SVC capabilities and computational limits advertised by the encoder works. If not, the decoding host controller can create a new configuration request and provide the new configuration request through a call to InitializeEncoder( ).

C. Run-Time Control Structures and Function Signatures

After the successful completion of the initialization phase, the encoder starts streaming the H.264 bitstreams. During the encoding and decoding that follows, the decoding host controller may need to adjust how the encoder operates in response to network bandwidth fluctuation, a remote decoder request, a decoding host-side resource change, or another factor. For this purpose, the decoding host controller creates and sends run-time control messages. For example, the decoding host controller can request the insertion of an intra-coded picture in a scalable layer to react packet loss at the decoding side.

FIG. 13a shows a structure (1301) for the StreamLayerId type, which the decoding host controller and encoding controller use to identify a specific layer of a specific bitstream for a run-time control message. The structure includes multiple layer identifiers as well as a stream identifier.

The H.264/SVC standard employs three layer identifiers to identify a scalable layer in a bitstream: temporal_id, quality_id and dependency_id. These layer identifiers are non-negative integers. Lesser values are associated with lower scalable layers, and greater values are associated with higher scalable layers. The stream layer ID structure (1301) includes fields TemporalId (3 bits), QualityId (3 bits), and DependencyId (4 bits) that correspond to the syntax elements temporal_id, quality_id and dependency_id, respectively. In order to create an identifier for a particular scalable layer of a particular stream, and thereby facilitate communication between decoding host controller and encoding controller, values for the layer identifiers are constrained as follows. For temporal_id, quality_id or dependency_id, the value starts from zero and is incremented by one in the next higher scalable layer for that identifier (e.g., according to separate numbering, values 0 . . . x for temporal_id, values 0 . . . y for quality_id, and values 0 . . . z for dependency_id).

The stream layer ID structure (1301) further includes a four-bit field StreamId whose value identifies a stream with which the particular layer is associated. In this way, the stream layer ID structure (1301) can be used to identify layers in different simulcast streams. For example, the value of StreamId indicates an index to the stream layout structures (1201) signaled as part of the call to InitializeEncoder ( ). More generally, StreamId is used between the encoding controller and decoding host controller to identify a particular stream for run-time control. When the configuration has only one stream, the value of StreamId is 0.

When multiple layers (in the same or different streams) are to be identified for a single control, wildcard masking can be used to reduce the number of control messages and calls. The maximum value in each field is reserved for wildcard masking purpose. For example, the value of 7 for TemporalId refers to layers with TemporalId 0 . . . 6.

FIGS. 13b-13g show function signatures for run-time control messages in the example implementation. The run-time control messages are implemented as function calls.

FIG. 13b shows a function signature (1302) for InsertSyncPicture( ) which allows the decoding host controller to request the insertion of a synchronization picture for a particular layer at run-time. This can be used, for example, to request that the encoder insert a key frame for the indicated stream layer wLayerId.

FIG. 13c shows a function signature (1303) for SetResolution( ) which allows the decoding host controller to change the resolution of a spatial scalable layer. This can be used to set spatial resolution of layer wLayerId to the resolution indicated with wBaseOutputWidth and wBaseOutputHeight.

FIG. 13d shows a function signature (1304) for SetPriorityId( ) which allows the decoding host controller to set the value of syntax element priority_id of a scalable layer. The priority_id can be used by a MLE MUX and DEMUX when processing a MLE bitstream. The meaning of the syntax element priority_id in the example implementation is detailed in U.S. patent application Ser. No. 13/235,217.

FIG. 13e shows a function signature (1305) for SetBitrateControlInfo( ) which allows the decoding host controller to set the quantization parameters or rate control parameters for a layer. In particular, the decoding host controller can set a peak bitrate, average bitrate and leaky bucket size for a given layer wLayerId. Or, the decoding host controller can set quantization parameters for intra-coded (I) content, predicatively coded (P) content and bi-predicatively coded (B) content of the given layer wLayerId.

FIG. 13f shows a function signature (1306) for StartLayer( ), which allows the decoding host controller to request that the encoder start streaming of a sub-bitstream that consists of the encoded data for the layer wLayerId and all of its lower dependent layers. This run-time control call can be used to cause the encoder to stream a proper subset of a full H.264/SVC bitstream.

FIG. 13g shows a function signature (1307) for StopLayer( ), which allows the decoding host controller to request that the encoder stop streaming of a sub-bitstream that consists of encoded data for the layer wLayerId and all of the higher layers that depend on it. This run-time control call can be used to cause the encoder to stop streaming certain layers.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computing system that implements an encoding controller, a method comprising:
  receiving a request for encoder capability data;
  with the computing system that implements the encoding controller, determining the encoder capability data, the encoder capability data including (1) data that indicate a number of component bitstreams for simulcast as part of a multi-layer encoding (MLE) bitstream, each of the component bitstreams providing an encoded representation of a different simulcast stream among multiple simulcast streams, each of the multiple simulcast streams including the same input video samples, wherein each of the component bitstreams is a scalable bitstream having a base layer and at least one enhancement layer or is a non-scalable bitstream having a single layer, and wherein each of the component bitstreams is decodable to reconstruct its version of the same input video samples, independent of decoding of other ones of the component bitstreams to reconstruct other versions of the same input video samples, and (2) data that indicate scalable video coding capabilities for encoding of the component bitstreams; and
  sending the encoder capability data.

2. The method of claim 1 wherein the request is received as part of a function call from a decoding host controller, and wherein the encoder capability data are sent as part of a reply to the decoding host controller.

3. The method of claim 1 wherein the number of component bitstreams is a maximum number of bitstreams, and wherein the scalable video coding capabilities apply for all of the component bitstreams.

4. The method of claim 1 wherein the encoder capability data further include data that indicate computational limits for the encoding of the component bitstreams.

5. The method of claim 4 wherein the computational limits are parameterized in terms of macroblocks per second.

6. The method of claim 4 wherein the data that indicate the computational limits are organized in an array having multiple indices, the multiple indices including a first index for number of spatial resolutions and a second index for degree of scalability.

7. The method of claim 1 wherein the encoder capability data further include data that indicate spatial resolution and/or frame rate of the same input video samples.

8. The method of claim 1 wherein the reconstructed version of the same input video samples for a first component bitstream of the component bitstreams has a different quality level, different spatial resolution, and/or different temporal resolution than the reconstructed version of the same input video samples for a second component bitstream of the component bitstreams.

9. A computer-readable medium storing computer-executable instructions for causing a computing system programmed thereby to perform operations, the computer-readable medium being selected from the group consisting of volatile memory, non-volatile memory, magnetic disk, CD-ROM, and DVD, the operations comprising:
  determining encoder capability data;
  creating stream configuration request data based at least in part on the encoder capability data, the stream configuration request data including (1) data that indicate a number of component bitstreams for simulcast as part of a multi-layer encoding (MLE) bitstream, each of the component bitstreams providing an encoded representation of a different simulcast stream among multiple simulcast streams, each of the multiple simulcast streams including the same input video samples, wherein each of the component bitstreams is a scalable bitstream having a base layer and at least one enhancement layer or is a non-scalable bitstream having a single layer, and wherein each of the component bitstreams is decodable to reconstruct its version of the same input video samples, independent of decoding of other ones of the component bitstreams to reconstruct other versions of the same input video samples, and (2) data that indicate scalable video coding options for the component bitstreams; and
  sending the stream configuration request data.

10. The computer-readable medium of claim 9 wherein the encoder capability data are received from an encoding controller, and wherein the stream configuration request data are sent as part of a function call to the encoding controller.

11. The computer-readable medium of claim 9 wherein the number of component bitstreams is a target number of bitstreams, and wherein the scalable video coding options are indicated separately for each of the component bitstreams.

12. The computer-readable medium of claim 9 wherein the stream configuration request data are based at least in part on data, in the encoder capability data, that indicate computational limits for encoding.

13. The computer-readable medium of claim 9 wherein the data that indicate the scalable video coding options include, for each of the component bitstreams:
 spatial resolution for the base layer of the component bitstream;
 number of temporal enhancement layers of the component bitstream; and
 one or more attributes for signal to noise ratio (SNR) enhancement layers at the spatial resolution for the base layer of the component bitstream.

14. The computer-readable medium of claim 13 wherein the data that indicate the scalable video coding options further include, for each of the component bitstreams, for an additional enhancement layer of the component bitstream:
 an upscaling ratio to reach a spatial resolution for the additional enhancement layer; and
 one or more attributes of SNR enhancement layers at the spatial resolution for the additional enhancement layer.

15. The computer-readable medium of claim 9 wherein the reconstructed version of the same input video samples for a first component bitstream of the component bitstreams has a different quality level, different spatial resolution, and/or different temporal resolution than the reconstructed version of the same input video samples for a second component bitstream of the component bitstreams.

16. A computing system comprising a processor and memory, wherein the computing system implements an encoding controller configured to:
 receive a request for encoder capability data;
 determine the encoder capability data, the encoder capability data including (1) data that indicate a number of component bitstreams for simulcast as part of a multi-layer encoding (MLE) bitstream, each of the component bitstreams providing an encoded representation of a different simulcast stream among multiple simulcast streams, each of the multiple simulcast streams including the same input video samples, wherein each of the component bitstreams is a scalable bitstream having a base layer and at least one enhancement layer or is a non-scalable bitstream having a single layer, and wherein each of the component bitstreams is decodable to reconstruct its version of the same input video samples, independent of decoding of other ones of the component bitstreams to reconstruct other versions of the same input video samples, and (2) data that indicate scalable video coding capabilities for encoding of the component bitstreams; and
 send the encoder capability data.

17. The computing system of claim 16 wherein the request is received as part of a function call from a decoding host controller, and wherein the encoder capability data are sent as part of a reply to the decoding host controller.

18. The computing system of claim 16 wherein the number of component bitstreams is a maximum number of bitstreams, and wherein the scalable video coding capabilities apply for all of the component bitstreams.

19. The computing system of claim 16 wherein the encoder capability data further include data that indicate computational limits for the encoding of the component bitstreams.

20. The computing system of claim 19 wherein the computational limits are parameterized in terms of macroblocks per second.

21. The computing system of claim 19 wherein the data that indicate the computational limits are organized in an array having multiple indices, the multiple indices including a first index for number of spatial resolutions and a second index for degree of scalability.

22. The computing system of claim 16 wherein the encoder capability data further include data that indicate spatial resolution and/or frame rate of the same input video samples.

23. The computing system of claim 16 wherein the reconstructed version of the same input video samples for a first component bitstream of the component bitstreams has a different quality level, different spatial resolution, and/or different temporal resolution than the reconstructed version of the same input video samples for a second component bitstream of the component bitstreams.

* * * * *